United States Patent
Venkataraman et al.

(10) Patent No.: US 10,604,236 B2
(45) Date of Patent: Mar. 31, 2020

(54) FAULT-TOLERANT AIRCRAFT FLIGHT CONTROL USING A SUBSET OF AERODYNAMIC CONTROL SURFACES

(71) Applicant: Regents of the University of Minnesota, Minneapolis, MN (US)

(72) Inventors: Raghu Venkataraman, Minneapolis, MN (US); Peter Seiler, St. Paul, MN (US); Brian Taylor, Portland, OR (US)

(73) Assignee: Regents of the University of Minnesota, Minneapolis, MN (US)

( * ) Notice: Subject to any disclaimer, the term of this patent is extended or adjusted under 35 U.S.C. 154(b) by 132 days.

(21) Appl. No.: 15/610,315

(22) Filed: May 31, 2017

(65) Prior Publication Data

US 2017/0349267 A1  Dec. 7, 2017

Related U.S. Application Data

(60) Provisional application No. 62/344,088, filed on Jun. 1, 2016.

(51) Int. Cl.
*B64C 13/18* (2006.01)
*B64C 39/02* (2006.01)
*G05D 1/08* (2006.01)

(52) U.S. Cl.
CPC ............ *B64C 13/18* (2013.01); *B64C 39/024* (2013.01); *G05D 1/0816* (2013.01)

(58) Field of Classification Search
None
See application file for complete search history.

(56) References Cited

U.S. PATENT DOCUMENTS

| 4,043,526 A | 8/1977 | Donley et al. |
| 5,806,805 A | 9/1998 | Elbert et al. |
| 5,819,188 A | 10/1998 | Vos |

(Continued)

FOREIGN PATENT DOCUMENTS

| CN | 104102225 A | 10/2014 |
| EP | 2594484 A2 | 5/2013 |

(Continued)

OTHER PUBLICATIONS

Kobayashi et al., "Design of Intelligent Fault-Tolerant Flight Control System for Unmanned Aerial Vehicles", Advances in Flight Control Systems, Dr. Agneta Balint (Ed.), 2011, p. 117-136 (Year: 2011).*

(Continued)

*Primary Examiner* — Tamara L Weber
(74) *Attorney, Agent, or Firm* — Shumaker & Sieffert, P.A.

(57) ABSTRACT

A method for controlling an unmanned aerial vehicle (UAV) is described. In one example, the method includes: detecting, by one or more processors of a controller within a UAV, whether flight control surfaces of the UAV are operating nominally; switching, by the one or more processors of the controller, in response to detecting that one or more of the flight control surfaces of the UAV are not operating nominally, to implementing a backup control mode configured to operate the UAV in flight with non-nominal operability of one or more of the control surfaces of the UAV; and operating, by the one or more processors of the controller, the UAV in the backup control mode.

31 Claims, 10 Drawing Sheets

(56) References Cited

U.S. PATENT DOCUMENTS

| | | | |
|---|---|---|---|
| 7,182,296 | B2 | 2/2007 | Yount et al. |
| 8,346,408 | B2 | 1/2013 | Ratliff |
| 9,045,220 | B2 | 6/2015 | Yamasaki |
| 2009/0012658 | A1 | 1/2009 | Cherepinsky et al. |
| 2013/0116863 | A1 | 5/2013 | Goupil et al. |
| 2014/0236396 | A1 | 8/2014 | Gheorghe et al. |
| 2014/0372078 | A1 | 12/2014 | Gheorghe et al. |
| 2015/0370258 | A1* | 12/2015 | Fleureau ............... B64C 39/024 701/3 |
| 2016/0107751 | A1 | 4/2016 | D'Andrea et al. |
| 2017/0212529 | A1* | 7/2017 | Kumar .................. G01C 21/165 |
| 2018/0114450 | A1* | 4/2018 | Glaab .................. G05D 1/0055 |

FOREIGN PATENT DOCUMENTS

| | | |
|---|---|---|
| EP | 2770392 A1 | 8/2014 |
| RU | 2012125844 A | 12/2013 |
| WO | 2011105536 A1 | 9/2011 |

OTHER PUBLICATIONS

Sever et al., "Linear Matrix Inequalities Based State Feedback and Reference Feedforward Actuator Saturated H-infinity Control of Small-Scale Unmanned Helicopter", 2015 9th International Conference on Electrical and Electronics Engineering (ELECO), Nov. 26-28, 2015, Bursa, Turkey, p. 801-805 (Year: 2015).*

Steinberg, "Historical overview of research in reconfigurable flight control," Proc. IMechE vol. 219, Aerospace Engineering, Jul. 22, 2005, 13 pp.

Zhang et al., "Bibliographical review on reconfigurable fault-tolerant control systems," Annual Reviews in Control, Elsevier, Mar. 23, 2008, 24 pp.

Jourdan et al., "Enhancing UAV Survivability Through Damage Tolerant Control," AIAA Guidance, Navigation, and Control Conference, Aug. 2-5, 2010, 26 pp.

Stewart et al., "Flight-Testing of the Self-Repairing Flight Control System Using the F-15 Highly Integrated Digital Electronic Control Flight Research Facility," NASA Technical Memorandum 101725, Aug. 1990, 16 pp.

Burken et al., "Longitudinal Emergency Control System Using Thrust Modulation Demonstrated on an MD-11 Airplane," 32nd AIAA/ASME/DAE?ASEE Joint Propulsion Conference, Jul. 1-3, 1996, 16 pp.

Ward et al., "Implementation and Flight Test Assessment of an Adaptive, Reconfigurable Flight Control System," Guidance, Navigation, and Control Conference, American Institute of Aeronautics and Astronautics, Inc., Aug. 11-13, 1997, 12 pp.

Page et al., "Flight Testing of a Retrofit Reconfigurable Control Law Architecture Using an F/A-18C," AIAA Guidance, Naviigation, and Control Conference and Exhibit, Aug. 21-24, 2006, American Institute of Aeronautics and Astronautics, Inc., 20 pp.

Schierman et al., "Integrated Adaptive Guidance and Control for Re-Entry Vehicles with Flight-Test Results," Journal of Guidance, Control and Dynamics, vol. 27, No. 6, Nov.-Dec. 2004, 14 pp.

Shore et al., "Flight Testing of a Reconfiurable Control System on an Unmanned Aircraft," Journal of Guidance, Control, and Dynamics, vol. 28, No. 4, Jul.-Aug. 2005, 10 pp.

Cieslak et al., "Development of an Active Fault-Tolerant Flight Control Strategy," Journal of Guidance, Control, and Dynamics, vol. 31, No. 1, Jan.-Feb. 2008, 14 pp.

Brinker et al., "Flight Testing of Reconfigurable Control Law on the X-36 Tailless Aircraft," Journal of Guidance, Control, and Dynamics, vol. 24, No. 5, Sep.-Oct. 2001, 7 pp.

Chowdhary et al., "Guidacne and Control of Airplanes Under Actuator Failures and Severe Structural Damage," Journal of Guidance, Control, and Dynamics, vol. 36, No. 4, Jul.-Aug. 2013, 12 pp.

Lombaerts et al., "Fault Tolerant Flight Control—A Benchmark Challenge," Published by Springer, 2010, ISBN 378-3-642-11689-6, Chapters 8 through 15, 589 pp. (Applicant points out, in accordance with MPEP 609.04(a), that the year of publication, 2010, is sufficiently earlier than the effective U.S. filing date, so that the particular month of publication is not in issue.).

"The Complete Unmanned Aerial System," Trimble, accessed from http://uas.trimble.com/ux5#collection-4 on Sep. 1, 2017, 6 pp.

"The Office of Rulemaking Committee Manual," ARM-001-015, Federal Aviation Administration, Revision 40, Feb. 2, 2015, 105 pp.

"The Professional Mapping Drone," eBee, SenseFly, accessed from www.sensefly.com on Sep. 1, 2017, 16 pp.

"The Standard in Mapping and Surveying," UX5 Aerial System, Trimble, accessed from http://www.trimble.com on Sep. 1, 2017, 6 pp.

Hoe et al., "Forced Oscillation Wind Tunnel Testing for Faser Flight Research Aircraft," American Institute of Aeronautics and Astronautics, Aug. 13, 2012, 12 pp.

Lie et al., "From Theory to Flight (Part 1)," An Airborn Experimental Test Platform, Inside GNSS, Mar./Apr. 2014, 16 pp.

Mica et al., H.R.658—FAA Modernization and Reform Act of 2012, introduced Feb. 11, 2011, accessed from https://www.congress.gov/bill/112th-congress/house-bill/658, 5 pp.

Miller et al., "Trimble UX5 Aerial Imaging Solution," Trimble, accessed from www.trimble.com/uas, last updated May 2013, 7 pages.

Owens et al., "Development of a Low-Cost Sub-Scale Aircraft for Flight Research: the FASER Project," American Institute of Aeronautics and Astronautics, Jan. 1, 2006, 11 pp.

Murch et al., "A Low Cost Small UAV Flight Research Facility," Advances in Aerospace Guidance, UISBN 978-3-642-19816-8, Springer-Verlang 2011,(Applicant points out, in accordance with MPEP 609.04(a), that the year of publication, 2011, is sufficiently earlier than the effective U.S. filing date, so that the particular month of publication is not in issue.) 12 pp.

SenseFly, "Field-Level Information that Scouting Can't Match," accessed from https://agribotix.com/ebee/ on Sep. 1, 2017, 4 pp.

Sentera, "Phoenix 2," accessed from http://www.sentera.com, Sep. 1, 2017, 2 pp.

Sentera, "Phoenix M," accessed from http://www.senetera.com, Sep. 1, 2017, 2 pp.

Skogestad et al., "Multivariable Feedback Control—Analysis and Design," IEEE Control Systems Magazine, Feb. 2007, 2 pp.

Venkataraman et al., "Model-Based Detection and Isolation of Rudder Faults for a Small UAS," American Institute of Aeronautics and Astronautics, Jan. 5, 2015, 18 pp.

Yeh, "Triple-Triple Redundant 777 Primary Flight Computer," Proceedings of Aerospace Applications Conference, Mar. 1996, 15 pp.

Reimann et al., "UAV for Relability," Aerospace Vehicle Design, AEM 4331, Dec. 19, 2013, 23 pp.

Reimann et al., "UAV for Relability Build," Aeropsace Vehicle Design, AEM 4333, May 2014, 45 pp.

Dorobantu et al., "An Airborne Experimental Test Platform: From Theory to Flight," American Control Conference, Jun. 17-19, 2013, 15 pp.

Venkataraman et al., "Safe Flight Using One Aerodynamic Control Surface," American Institute of Aeronautics and Astronautics, Jan. 5, 2016, 13 pp.

Hwang et al., "A Survey of Fault Detection, Isolation, and Reconfiguration Methods," IEEE Transactions on Control Systems Technology, vol. 18, No. 3, May 2010, 18 pp.

Isermann., "Fault-tolerant design—Chapter 18," Fault Diagnosis Systems, Online ISBN 978-3-540-30368-8, Springer-Verlag 2006, (Applicant points out, in accordance with MPEP 609.04(a), that the year of publication, 2006, is sufficiently earlier than the effective U.S. filing date, so that the particular month of publication is not in issue.) 8 pp.

Isermann., "Fault-Tolerant Components and Control—Chapter 19," Fault Diagnosis Systems, Online ISBN 978-3-540-30368-8, Springer-Verlag 2006, (Applicant points out, in accordance with MPEP 609.04(a), that the year of publication, 2006, is sufficiently earlier than the effective U.S. filing date, so that the particular month of publication is not in issue.) 11 pp.

(56) References Cited

OTHER PUBLICATIONS

"Unmanned Aircraft System," Trimble UX5, Datasheet, accessed on Sep. 1, 2017, 2 pp.

* cited by examiner

FAULT-TOLERANT AIRCRAFT FLIGHT CONTROL USING A SUBSET OF AERODYNAMIC CONTROL SURFACES

This application claims the benefit of U.S. Provisional Application No. 62/344,088 by Venkataraman, entitled, "FAULT-TOLERANT AIRCRAFT FLIGHT CONTROL USING A SUBSET OF AERODYNAMIC CONTROL SURFACES" and filed on Jun. 1, 2016, the entire content of which is incorporated herein by reference.

GOVERNMENT INTEREST

This invention was made with government support under NSF/CNS-1329390 awarded by the National Science Foundation. The government has certain rights in the invention.

TECHNICAL FIELD

The invention relates to aircraft flight control systems.

BACKGROUND

Recently, unmanned aerial vehicles/systems (UAVs/UASs) have found increasing civilian and commercial applications, such as law enforcement, search and rescue, and precision agriculture. These commercial applications require UAVs to operate in civilian airspace. Central to operating UAVs in civilian airspace is the challenge of meeting the stringent safety standards set by the Federal Aviation Administration (FAA). In 2012, the United States Congress passed H.R.658—the FAA Modernization and Reform Act—in order to facilitate the safe integration of UASs into the national airspace. In particular, section 332 of H.R.658 mandates the FAA to "provide for the safe integration of civil unmanned aircraft systems into the national airspace system as soon as practicable, but not later than Sep. 30, 2015." In August 2016, the FAA's Final Rule for 14 CFR Part 107 became effective and laid out rules for UAS operators to follow. This brings in legislative and policy dimensions to what is academically seen as a technical challenge.

To put this challenge in perspective, consider the current safety standards set by the FAA for manned commercial aircraft. In order for a manned commercial aircraft to be certified, there should be no more than one catastrophic failure per $10^9$ flight hours. Commercial aircraft manufacturers, such as Boeing, meet the $10^{-9}$ failures-per-flight-hour standard by utilizing hardware redundancy. For example, the Boeing 777 has 14 spoilers each with its own actuator: two actuators each for the outboard ailerons, left and right elevators, and flaperons; and three actuators for the single rudder. On the other hand, most civil UAVs have reliabilities that are orders of magnitude below the standard of $10^{-9}$ failures-per-flight-hour. For instance, the UAV Research Group at the University of Minnesota (UMN) operates an Ultra Stick 120 aircraft (described further below) with single-string, off-the-shelf components. A comprehensive fault tree analysis yielded a failure rate of $2.2 \times 10^{-2}$ failures-per-flight-hour for this aircraft.

UAVs have such low reliability for two main reasons. First, most on-board components are not very reliable because they are low-cost. Second, most on-board components have little to no hardware redundancy. Consequently, there are single points of failure that can lead to catastrophic failure. Safe integration of UAVs into the national airspace requires increases in UAV reliability. However, the solutions adopted to increase the reliability of manned commercial aircraft are not downwardly scalable to UAVs, in particular, hardware redundancy must be used judiciously because of the costs associated with size, weight, and power. Analytically redundant solutions, such as robust and fault-tolerant control, have the potential to bridge the gap between commercial aircraft, that almost entirely use hardware redundancy, and current UAVs, that are almost entirely single-string designs.

SUMMARY

In general, examples of this disclosure provide control systems and methods for UAVs to operate successfully with reduced control authority or reduced control of control surfaces, such as if actuation fails on one or more of the aerodynamic control surfaces. In some examples, a control system of this disclosure may use a Linear Quadratic Gaussian (LQG) control law implementation that accounts for control failures of one or more control surfaces and implements a backup control mode with re-assigned parameters or weights to the parameters of an LQG control law that may successfully maintain the UAV in flight with as little as one remaining operable control surface. A system of this disclosure may be configured to normally operate the UAV in a standard control mode, detect when the UAV suffers a control failure of one or more control surfaces, and respond to detecting the control failure by switching the UAV control mode from the standard control mode to the backup control mode.

Civil unmanned aircraft will need to meet stringent safety standards before they are certified to operate in the national airspace of the United States. Reliability is a key requirement for certification. Most current civil unmanned aircraft are not reliable because of the presence of single points-of-failure and the use of low-reliability components. For example, many fixed-wing unmanned aircraft are equipped with only two aerodynamic control surfaces. A fault in any one surface will usually spell catastrophe. Systems of this disclosure may eliminate this single point-of-failure using multi-variable control laws. A single aerodynamic control surface is shown to be sufficient to stabilize the aircraft and execute a set of limited maneuvers. These limited maneuvers are sufficient to safely fly to a landing spot. This concept was proved using flight tests on an unmanned aircraft at the University of Minnesota. The results are also applicable to manned commercial aircraft. Controllability with one surface indicates the large potential to mitigate faults that might otherwise lead to loss-of-control events.

The techniques of this disclosure describe technical improvements that allow a controller to safely fly an aircraft with only one functional aerodynamic control surface. Accordingly, a two-surface UAV implementing the techniques described within can be made fault-tolerant up to one control surface. In one example, a system uses robust, multivariable feedback control laws to provide single-surface fault-tolerance for controlling, flying, and/or landing a two-surface UAV. Thus, such a system as described herein may reduce or eliminate single-points-of-failure in many types of aircraft, such as a two-surface UAV. Further, such a system as described herein may provide additional redundancy and increased safety for control surfaces of aircraft. Further, such a system as described herein may allow for the reduction of redundant parts, allowing for reduced cost of manufacture and operation.

In one embodiment, the invention is directed to a method that includes detecting, by one or more processors, whether flight control surfaces of an aircraft are operating nominally. The method further includes switching, by the one or more processors, in response to detecting that one or more of the flight control surfaces of the aircraft are not operating nominally, to implementing a backup control mode configured to operate the aircraft in flight with non-nominal operability of one or more control surfaces of the aircraft. The method further includes operating, by the one or more processors, the aircraft in the backup control mode.

In another embodiment, the invention is directed to a system configured to detect whether flight control surfaces of an aircraft are operating nominally. The system is further configured to switch, in response to detecting that one or more of the flight control surfaces of the aircraft are not operating nominally, to implementing a backup control mode configured to operate the aircraft in flight with non-nominal operability of one or more control surfaces of the aircraft. The system is further configured to operate the aircraft in the backup control mode.

In another embodiment, the invention is directed to a computer-readable medium containing executable instructions. The instructions cause a programmable processor to detect whether flight control surfaces of an aircraft are operating nominally. The instructions further cause the programmable processor to switch, in response to detecting that one or more of the flight control surfaces of the aircraft are not operating nominally, to implementing a backup control mode configured to operate the aircraft in flight with non-nominal operability of one or more control surfaces of the aircraft. The instructions further cause the programmable processor to operate the aircraft in the backup control mode.

The details of one or more embodiments of the invention are set forth in the accompanying drawings and the description below. Other features, objects, and advantages of the invention will be apparent from the description and drawings, and from the claims.

DETAILED DESCRIPTION

Examples described herein demonstrate the possibility of safely flying a fixed-wing aircraft with only one aerodynamic control surface. To motivate this result, consider a typical two-surface UAV, pictured in FIG. 1.

Figure 1:
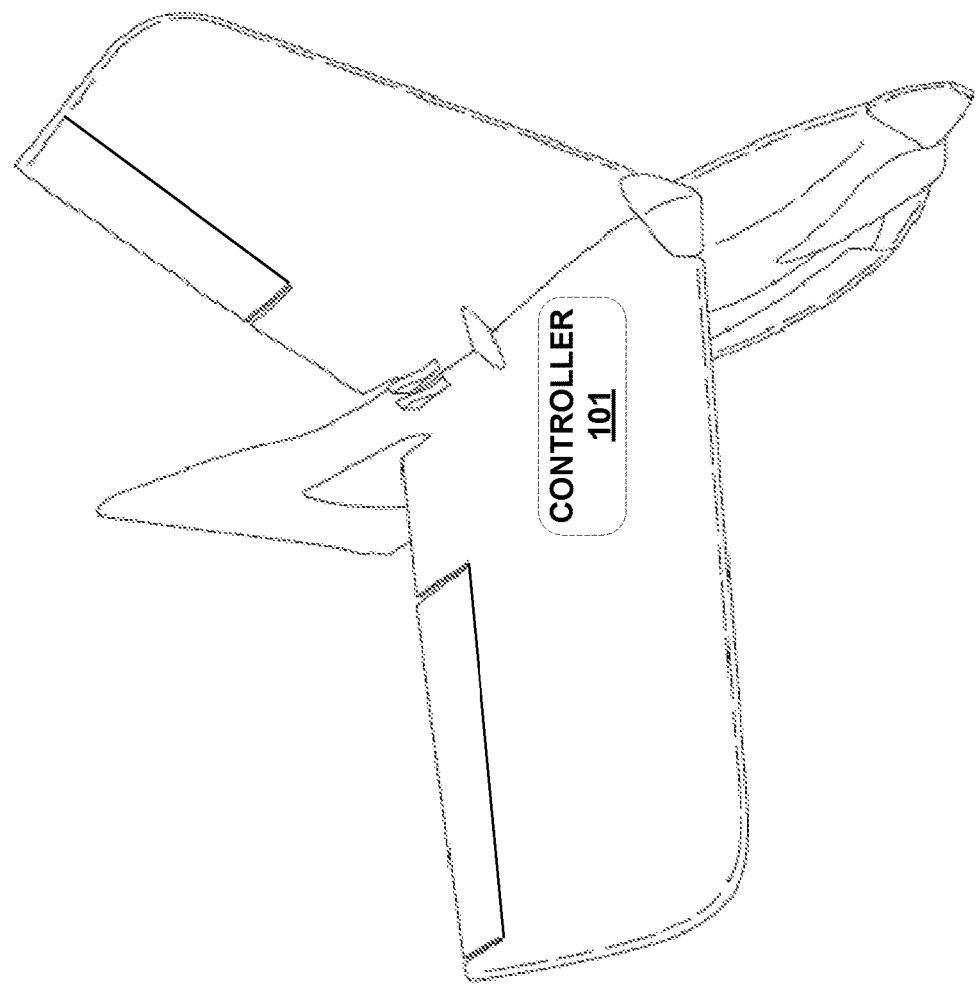
FIG. 1 is an illustration of a two-control-surface UAV.

FIG. 1 is an illustration of a two-control-surface UAV. In one example, the UAV is a Sentera Vireo 100. A two-control-surface UAV has a pair of elevons that provide roll and pitch control authorities. Normally, both elevons are mission-critical. In other words, a failure in either elevon leads to loss of mission (LOM). However, if the aircraft is not fault-tolerant, both elevons become safety-critical. A safety-critical component is one whose failure eventually leads to loss of control (LOC) and catastrophic failure. In addition to being safety-critical, the two elevons are also individual single-points-of-failure in two-control-surface UAVs such as the Vireo. In other words, a single failure in either elevon is all it takes to cause catastrophic failure. This disclosure describes example implementations in which a controller may apply advanced feedback control techniques to make even a two-surface UAVs tolerant to faults in either control surface. In other words, technical improvements are described herein by which a controller may control return flight and landing of a UAV even if only a single control surface is operational.

All the example two-surface UAVs described herein are used for aerial surveillance and mapping. After a control surface failure, the mission is degraded to safely flying home. In order to safely fly home, the aircraft should be able to execute a limited set of maneuvers. This includes, at the very least, straight and level flight at constant altitude, either left or right banked turns, and steady descents.

As described herein, control circuitry 101 of UAV 101 functions as an aircraft control system to generate a flight path to a safe landing spot using combinations of these canonical maneuvers. Furthermore, control circuitry executes the limited set of maneuvers described above using the control techniques described herein to safely control UAV 101, return home, and land the aircraft. Various results presented below demonstrate the execution of these canonical maneuvers based on the control techniques described herein.

Figure 2A:
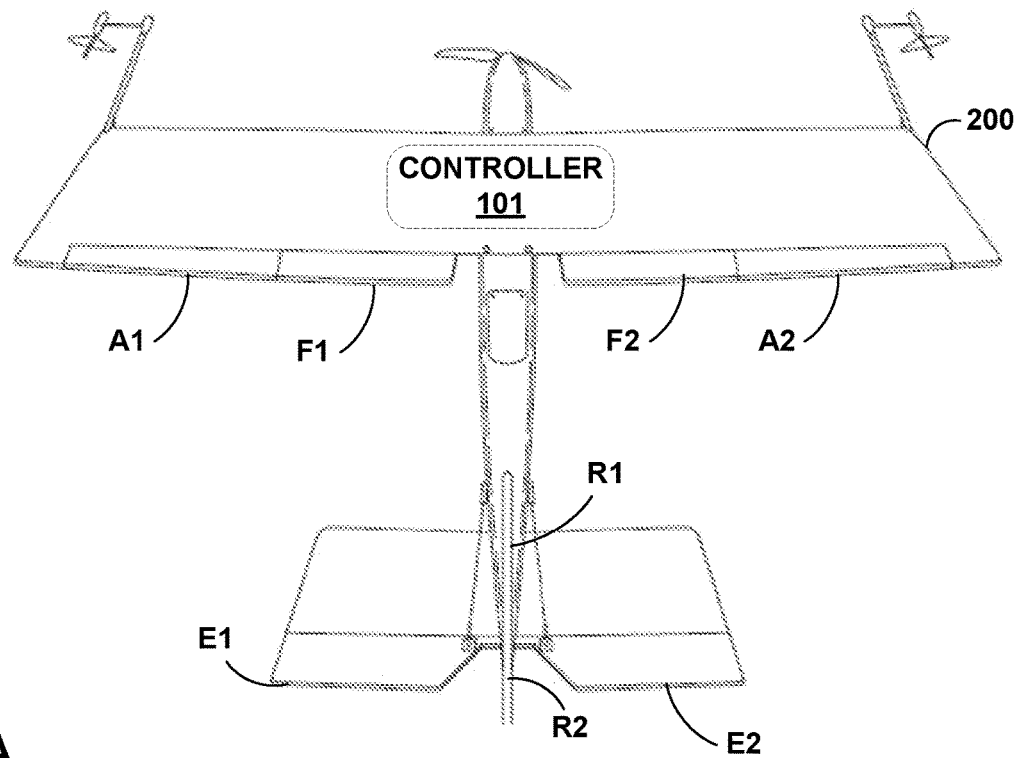
FIGS. 2A-2B are illustrations, with superimposed labels, of two views (FIG. 2A and FIG. 2B) of a UAV in accordance with example aspects of this disclosure.
Figure 2B:
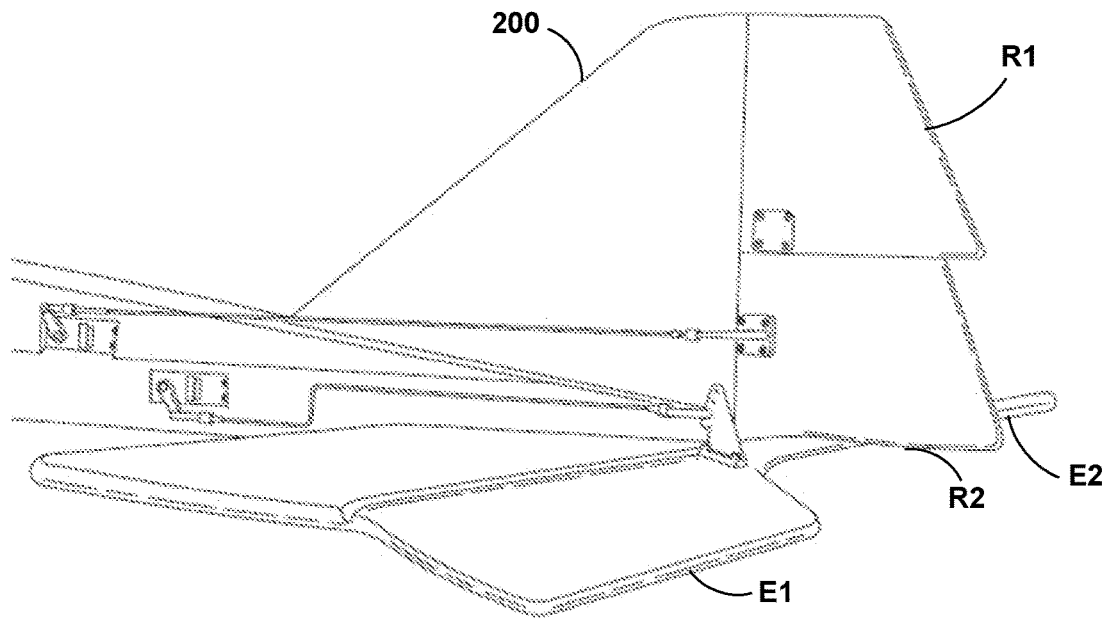

FIGS. 2A-2B are illustrations, with superimposed labels, of two views (FIG. 2A and FIG. 2B) of a UAV 200 in accordance with example aspects of this disclosure. In one example, the UAV is based on an eight-control surface Ultra Stick 120 UAV airframe. The Ultra Stick 120 is a commercial, off-the-shelf, radio-controlled aircraft with a wingspan of 1.92 meters and a mass of about 8 kilograms (kg). The airframe of UAV 200 has been retrofitted with custom avionics for real-time control, guidance, navigation, and fault detection in accordance with the techniques of the disclosure. The avionics include a sensor suite, a flight control computer, and a telemetry radio. However, the techniques of the disclosure may be performed on UAVs with other numbers of control surfaces, such as a two-control surface UAV.

In some examples, UAV 200 has a total of eight aerodynamic control surfaces, each actuated by its own servo motor. These surfaces are labeled in FIG. 2 as flaps ($F_{1,2}$), ailerons ($A_{1,2}$), elevators ($E_{1,2}$), and rudders ($R_{1,2}$). The split elevators and rudders are custom modifications that are unique to the example of UAV 200 of FIG. 2. The sign convention of the control surfaces is as follows. A trailing edge down deflection of the elevators, ailerons, and flaps is considered positive. A trailing edge left deflection of the rudders, when viewed top-down, is considered positive. In addition, all the surfaces have a deflection range of [−25°, +25]. While each surface is independently actuated, the flight software allows for them to be coupled symmetrically (such as the elevators) or anti-symmetrically (such as the ailerons). While UAV 200 may appear to be over-actuated for a small UAV, the flight software allows the control designer to choose the specific surfaces that are to be controlled. Moreover, these redundant surfaces allow for the testing and validation of fault-tolerant and reconfigurable control laws. Such redundant surfaces serve as a technology demonstrator for refinement and testing of the techniques of the disclosure. From an infrastructure standpoint, this aircraft serves as the test platform for some of the safety-critical and aircraft reliability research that is being undertaken by the UMN UAV Research Group.

A high-fidelity simulation environment for the Ultra Stick 120 is publicly available. This simulation environment was built using Matlab/Simulink and contains models for the aircraft subsystems. The rigid body dynamics are implemented using the standard six degree-of-freedom, nonlinear aircraft equations of motion. The aerodynamic stability and control derivatives were identified from wind tunnel experiments. The simulation models the forces and moments and the propeller wash generated by the electric motor and propeller pair. The simulation also includes actuator models for the servo motors and sensor models for the inertial measurement unit (IMU), air data probes, and magnetometer. Environmental effects, such as wind gusts, atmospheric turbulence, and the Earth's gravitational and magnetic fields are modeled using subsystems. The nonlinear aircraft model can be trimmed and linearized at any flight condition within the flight envelope of the aircraft. The simulation environment and the flight control computer allow for extensive software-in-the-loop and hardware-in-the-loop simulations.

Experimental flight tests were conducted on UAV 200 to demonstrate safe flight using only one control surface. Because UAV 200 is equipped with eight control surfaces, control circuitry 101 (e.g., the flight computer) is used to select the single surface to be actuated. This single surface must have sufficiently high roll and pitch control authorities. The only surfaces that qualify for this challenge are the left and right elevators (E1 and E2 in FIG. 2B). The ailerons, flaps, and rudders have negligible pitch control authority. UAV 200 is representative of conventional airframes with a fuselage and empennage. In addition, by employing the split elevators as elevons, UAV 200 can also act like a two-surface UAV. Therefore, demonstrating safe flight on UAV 200 with only the left or right elevator should be a good indicator of whether the same is possible on larger conventional aircraft as well as on smaller two-surface UAVs, such as UAV 100 of FIG. 1.

Irrespective of the type of aircraft that is being emulated, the aircraft may operate in a baseline control mode when all surfaces are healthy. Various implementations of fault-tolerant control in accordance with this disclosure may include a baseline or standard control mode implementation, a fault detection and isolation (FDI) system (e.g., an FIN algorithm executed by an appropriate processor with appropriate sensor inputs), a backup or reduced control mode, and a transition system to switch between the baseline and backup control modes. Any of various FDI algorithms may be used with a backup control mode implementation of this disclosure. The FDI system may serve as a real-time fault detection device, and switch the aircraft from the standard or baseline operating mode to the backup or reduced-function operating mode. The transition system may include a simple instantaneous switch from the baseline control mode to the backup control mode.

When the backup or reduced-function operating mode activates or takes over operation of the aircraft from the standard or baseline operating mode, the backup operating mode may effectively detect specifically which control surfaces are and are not operational, and what the state is of the failed one or more control surfaces. The FDI algorithm may perform functions of isolating a faulty control surface, and the FDI algorithm and/or the backup control law together may provide fault-tolerance. The backup control mode may then determine and implement a new set of weighting parameters for the aircraft controller, such as new weighting parameters for roll rate p, pitch rate q, and yaw rate r, or another set of weighting parameter variables, so as to compensate for the failure modes of the one of more faulty control surfaces, and to maintain controlled flight of the aircraft, as further described below.

The backup control mode may also incorporate a mathematical model of the specific aircraft it is controlling. The mathematical model of the specific aircraft may effectively describe the physical parameters of the aircraft and its dynamical response to the actuation of its aerodynamic control surface(s) and power producing unit(s), such as electric motors. The mathematical model of the aircraft may be used in revising its operating regime and in modifying the controller parameters. The backup control mode may further incorporate a model of the detected trim state of the aircraft. That is, the backup control triode may incorporate a model of the detected faulty state of the one or more failed control surfaces, such as whether one or more elevators, ailerons, flaps, or rudders is stuck or otherwise under reduced control; and how those one or more failed control surfaces is faulty, such as if the control surface is stuck at a certain angle, for example. The backup control mode may use the model that incorporates the state of the one or more failed control surfaces as well as the state of one or more remaining fully functional control surfaces in determining the controller parameters to be applied. In this way, the backup control mode controls the one or more remaining functional control surfaces to operate the aircraft in flight.

The backup control mode may take into account inputs from each of the control surfaces of the aircraft, and the effect that the state of each of those control surfaces has on each of the degrees of freedom of the aircraft. The complete possible sets of control surface states may define a superset of models of the possible states of the aircraft and its potential operating states. The backup control mode may respond to the detection of a faulty one or more control surfaces by detecting and implementing an operating state, from within that superset of possible operating states, that corresponds to the detected reduced functionality state of the aircraft.

In other words, the backup control mode may take into account the effect that each of the control surfaces of the aircraft, and their respective states of operation, has on each of the degrees of freedom of the aircraft. By using the mathematical model of the aircraft and the detected trim state, the backup control mode may create a superset of all possible operating states of the aircraft and a simplified mathematical description of the behavior of the aircraft at each of the possible operating states. Moreover, the backup control mode may contain controller parameters at each of the possible operating states, again forming a superset of controllers. The backup control mode may respond to the detection of one or more faulty control surfaces by implementing an operating state and controller, from within that superset of possible operating states and controllers, that corresponds to the detected reduced functionality state of the aircraft.

Illustrative examples of the backup control mode selecting from the superset of possible operating states are presented below with reference to certain simplified special cases of failure modes. Various results are presented below are directed to a scope of failure modes limited in two specific ways, for purposes of simplified analysis, though other example implementations may detect and act to resolve any other types of control surface failures. In the selected special case failure modes considered below, first, only instantaneous stuck actuator faults are considered. This assumption disregards dynamic actuator fault modes, such as oscillatory and ramp failures, Second, the actuators are assumed to get stuck at their respective trim positions. In other words, only fault modes that do not alter the trim point are considered. While these two assumptions may seem overly restrictive, it is a good starting point for a technology demonstration exercise. In order to make this scope rigorous and set the stage for control design (further below), some mathematical preliminaries are introduced below.

The aircraft equations of motion can be described in the nonlinear state-space thrill, as shown in equations 1 and 2.

$$\dot{x}=f(x,u,t) \quad (1)$$

$$y=h(x,u,t) \quad (2)$$

In this form, $x \in \mathbb{R}^n$ is the state vector, $u \in \mathbb{R}^m$ is the input vector, $y \in \mathbb{R}^p$ is the output vector, and $t \in \mathbb{R}^+$ is time. In addition, $f: \mathbb{R}^n \times \mathbb{R}^m \to \mathbb{R}^n$ is the state function and $h: \mathbb{R}^n \times \mathbb{R}^m \to \mathbb{R}^p$ is the output function. The state vector is: $x=[\phi, \theta, p, q, r, u, v, w]^T$. Here, $\phi$ and $\theta$ are two of the Euler angles of the aircraft. The third Euler angle ($\psi$), is not included in the state vector because only inner loop controllers are developed in this disclosure. The aircraft's angular velocity in the body-fixed frame are: roll rate (p), pitch rate (q), and yaw rate (r). The airspeed components in the body-fixed frame are u, v, and w. It is mentioned above that only the left and right elevators qualify for the challenge of single surface flight. Consequently, the input vector is: $u=[\tau, E_1, E_2]^T$. Here, $\tau$ is the throttle setting and $E_1$ and $E_2$ are the deflections of the left and right elevators, respectively. The output vector (y) contains some new variables in addition to those in the state vector (x). The airspeed, angle of attack, angle of sideslip, and flight path angle are denoted by V, a, $\beta$, and $\gamma$, respectively.

Aircraft typically fly around equilibrium or trim points. These are operating points at which some state derivatives are zero, and others have constant values. The collection of all such trim points defines the steady flight envelope ($\mathbb{F}$) of the aircraft, as shown in equation 3.

$$\mathbb{F}=\{(\bar{x},\bar{u}):f(\bar{x},\bar{u})=0\} \quad (3)$$

The limited set of maneuvers described above can be described as subsets of $\mathbb{F}$, as given in equations 4 through 6. Banked right turns have a form similar to equation 6, except that $\bar{\phi}>0$.

$$\mathbb{F}_{straight,level}=\{(\bar{x},\bar{u})\in\mathbb{F}:\bar{p}=\bar{q}=\bar{r}=\bar{\phi}=\bar{\gamma}=0\} \quad (4)$$

$$\mathbb{F}_{steady,descent}=\{(\bar{x},\bar{u})\in\mathbb{F}:\bar{p}=\bar{q}=\bar{r}=\bar{\phi}=0,\bar{\gamma}<0\} \quad (5)$$

$$\mathbb{F}_{banked,left}=\{(\bar{x},\bar{u})\in\mathbb{F}:\bar{\phi}<0,\bar{\gamma}=0\} \quad (6)$$

The scope of demonstration can now be mathematically defined. Consider, for example, a stuck fault in the right elevator ($E_2$) that occurs at time $T_f$. Moreover, let the trim deflection be $\bar{E}_2$. The assumptions imply that $E_2(t \geq T_f)=\bar{E}_2$. When the same assumption is applied to all the stuck surfaces, it is seen that the trim point $(\bar{x},\bar{u})$ is unaltered by the control surface faults. This simplification serves well to demonstrate the proof of concept in this disclosure. In particular, the steady state of the aircraft is unaltered, implying that the actuator faults induce small transients in the aircraft states. These small transients make the switchover from the baseline control mode to the backup control mode relatively smooth and stable. However, it is acknowledged that a rigorous demonstration will involve relaxing these assumptions to include dynamic actuator faults as well as trim point variations. The main impact of relaxing these assumptions will be larger transient effects in the aircraft states after the onset of the faults. These transient effects will have to be effectively managed by the backup controller. Controllers that have enhanced robustness and those that explicitly depend on the operating point, such as linear parameter varying (LPV) controllers, are promising solutions.

Fault-Tolerant Control Synthesis in terms of a linear aircraft model are described as follows. The nonlinear aircraft model is linearized about the nominal trim point for applying linear control synthesis techniques. The linearized aircraft model has a state-space representation shown in equations 7 and 8.

$$\dot{\tilde{x}}=A\tilde{x}+B\tilde{u} \quad (7)$$

$$\tilde{y}=C\tilde{x}+D\tilde{u} \quad (8)$$

The linearized dynamics are written in terms of the perturbation quantities: $\tilde{x}$, $\tilde{u}$, and $\tilde{y}$. The total signal is the sum of the trim and perturbation components. For example, $x=\bar{x}+\tilde{x}$. Throughout the remainder of this section, the tilde will be dropped from the perturbation components of the linear model.

For demonstration in one example, the left elevator $E_1$ may be the only controllable surface. The corresponding input vector is $u=E_1$. It should be noted that, in general, the throttle can also be used for fault-tolerant control. The state vector is the same as before: $x=[\phi,\theta,p,q,r,u,v,\omega]^T$. The output vector is $y=[\phi,\theta,p,q,r]$, and contains all the measured and estimated signals used for feedback control. The angular rates in the body-fixed frame (p; q; r) are directly measured by a strap-down IMU of UAV 200—the only sensor in this example that is used for feedback control in this disclosure. The Euler angles ($\phi$, $\theta$) are estimated using a fifteen-state extended Kalman filter (EKF). The linear accelerations (ax; ay; az) from the strap-down. MU are not used in feedback because of the presence of biases. Although these biases can be easily estimated using the EKF, this is not done in this example, for the sake of simplicity. Given this output vector, only inner loop controllers are developed. The nominal trim point of UAV 200 and the linear aircraft model P are described below. This linear model P can be shown to be both controllable and observable using the Kalman rank test. In addition, a balanced realization of the linear model P has the following Hankel singular values: [9.44; 4.93; 3.4; 1.72; 0.59; 0.06; 0.02, 0.02]. This indicates that some states are much more controllable and observable than others. However, this is not particularly problematic in the control synthesis.

The baseline control mode for UAV 200 is a classical loop-at-a-time design. In this design, the longitudinal and lateral-directional aircraft dynamics are assumed to be decoupled. Hence, separate loops are designed for each dynamics. The longitudinal loop controls the throttle and elevators. The lateral-directional loop controls the ailerons and rudders. Flaps may be pilot-controlled. Each control loop has a classical cascade structure with inner and outer loops. The backup control mode laws are synthesized using multi-variable control theory and are based on the linear aircraft model parameters described below. As described, the backup control laws implemented by the control systems described herein are designed to actuate only the non-failing control surface (left elevator ($E_1$) in this example) while locking all the remaining surfaces (i.e., the failed control surfaces) into their respective trim positions. A multi-input-multi-output (MIMO) approach may be necessary for synthesizing the backup control laws because the left elevator excites both the longitudinal and the lateral-directional dynamics.

Linear quadratic Gaussian (LQG) control for the backup control mode is described as follows. The first backup control mode law is an LQG design, shown by the dashed box $K_{LQG}$ in FIG. 3 as described below.

Figure 3:
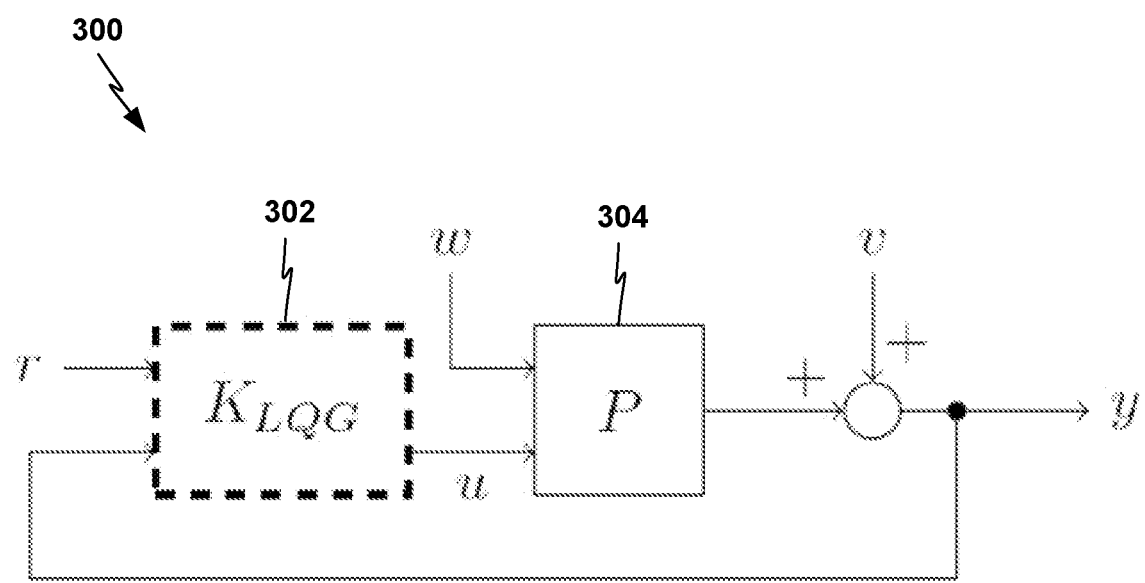
FIG. 3 depicts a conceptual block diagram of a Linear Quadratic Gaussian (LQG) control law implementation in accordance with example aspects of this disclosure.

FIG. 3 depicts a conceptual block diagram of a Linear Quadratic Gaussian (LQG) backup control mode system 300 in accordance with example aspects of this disclosure. LQG controllers are primarily used for output regulation around the trim point. However, in order to demonstrate command tracking, integrators can be added to specific output channels. In this disclosure, the LQG control mode law regulates roll, pitch, and yaw rates p; q; r around zero and tracks roll and pitch reference commands. The controller $K_{LQG}$ 302 has a two degrees-of-freedom structure: one for the reference commands r and the other for the measurements y. The LQG controller has three parts internally (not shown in FIG. 3): a total feedback gain, a Kalman filter, and integrators. The total feedback gain is composed of the optimal state feedback gain ($K_{sf}$) as well as the integral gain. The state feedback gain has a size compatible with the state vector. The controller $K_{LQG}$ 302 generates an output and provides the output to a linear model P 304, which also receives an input for a process noise signal (w). The linear model P 304 generates an output, which is combined with a measurement noise signal (v). That combination is provided as the output of the LQG control mode system 300, and is fed back as an input to controller $K_{LQG}$ 302. Controller $K_{LQG}$ 302 also receives reference commands (r) as an input.

The state feedback law $u=K_{sf}\hat{x}$ minimizes the following quadratic cost function, $$J(x_0,u)=\int_0^\infty (\hat{x}^T Q\hat{x}+u^T Ru)dt, \qquad (9)$$

subject to the system dynamics given in equation 7. In equation 9, $\hat{x}$ is the estimated state vector and $x_0$ is the initial condition at t=0. The state feedback gain $K_{sf}$ is obtained by solving an associated algebraic Riccati equation. A Kalman filter is used to provide the state estimates ($\hat{x}$) to the state feedback law. The Kalman filter has access to sensor measurements (y) and control commands (u).

In some examples, the backup control mode may use a Kalman filter to minimize the steady-state covariance of the error in the state estimates, in accordance with:

$$\lim_{t\to\infty} E[(x-\hat{x})(x-\hat{x})^T].$$

By acting to minimize the steady-state covariance of the error in the state estimates in this way, the backup control mode may operate the remaining functional control surfaces in such a way as to effectively reduce or minimize the aircraft's impairment in maintaining controlled flight. By minimizing the steady-state covariance of the state estimation error, the Kalman filter provides the backup control mode with the best estimate of the state vector of the aircraft. The backup control mode then uses the best estimate of the aircraft state to control the remaining operable surfaces in a way to maintain the aircraft in flight despite the one or more control surface failures.

FIG. 3 also shows process noise (w) and measurement noise (v) signals. The covariance of these signals are used in the synthesis of the Kalman filter.

The controller $K_{LQG}$ also contains integrators for tracking roll and pitch reference commands, supplied as: $=[\phi_{cmd}, \theta_{cmd}]^T$. The tracking error (e) is formed between r and the estimated Euler angles as: $e=r-[\phi,\theta]^T$. The tracking error is integrated over time and then multiplied by the integral gain. Example metrics are depicted below that describe the robustness of the LQG control law to uncertainties in the aircraft model. The LQG control mode law has limited objectives: regulating p; q; r around zero and tracking $\phi_{cmd}$ and $\theta_{cmd}$.

LQG backup control mode system 300 may be implemented in a hardware block that includes one or more processors, which may include any general logic processing elements, and various input elements and output elements. A flight controller of a UAV, such as flight controller 101 of UAV 100 of FIG. 1, that implements such an LQG backup control mode system 300 may thus perform or embody a method that may include detecting whether flight control surfaces of an aircraft are operating nominally; switching, in response to detecting that one or more of the flight control surfaces of the aircraft are not operating nominally to implement an LQG backup control mode configured to operate the aircraft in flight with non-nominal operability of one or more control surfaces of the aircraft; and operating the aircraft in the backup control mode.

In some examples, the flight controller may also detect a trim state of the one or more of the flight control surfaces of the aircraft are not operating nominally; and incorporate the detected trim state of the one or more of the flight control surfaces of the aircraft that are not operating nominally in the reduced flight control surface operability control mode (e.g., as input to LQG backup control mode system 300). The flight controller may implement the backup control mode by modifying the parameters of the flight controller based on a linear quadratic Gaussian (LQG) design (e.g., based on output of LQG backup control mode system 300).

The flight controller may implement LQG backup control mode system 300 by using a Kalman filter to minimize steady-state covariance of error in state estimates of a linearized aircraft model in a state-space representation. Using the Kalman filter to minimize the steady-state covariance of the error in the state estimates may include determining an optimization in accordance with the following function:

$$\text{minimize}\left(\lim_{t\to\infty} E[(x-\hat{x})(x-\hat{x})^T]\right)$$

The resulting Kalman filter may be part of the larger LQG backup control mode system 300.

Operating the aircraft in the backup control mode may include implementing a return and land procedure for the aircraft. The control systems of the aircraft may also initially operate the aircraft in a standard control mode, and may perform detecting whether the flight control surfaces of the aircraft are operating nominally at least once during operating the aircraft in the standard control mode.

In order to incorporate multiple control objectives and enhance the disturbance rejection properties of the closed loop, another example involving $H_\infty$ control is also described below. The second example backup control mode law in this disclosure is an $H_\infty$ design that allows for multiple design objectives to be specified. A generalized plant with all the weighting functions is described below with reference to FIG. 4.

Figure 4:
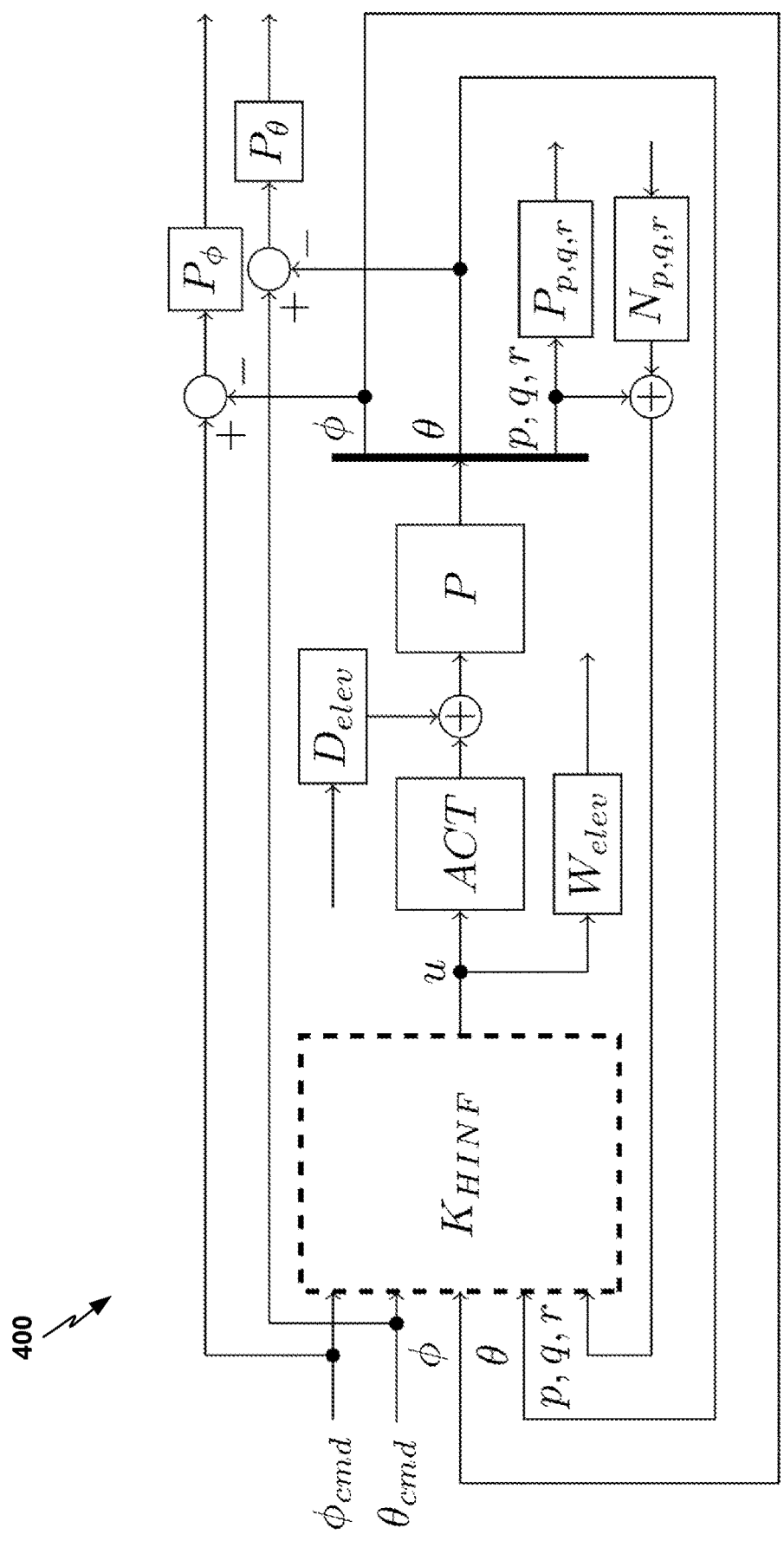
FIG. 4 depicts a conceptual block diagram of an $H_\infty$ control law implementation with generalized plant interconnection in accordance with example aspects of this disclosure.

FIG. 4 depicts a conceptual block diagram of an $H_\infty$ control law implementation 400 with generalized plant interconnection in accordance with example aspects of this disclosure. The two degrees-of-freedom controller that is synthesized is shown by the dashed box $K_{HINF}$. Reference commands are $\phi_{cmd}$ and $\theta_{cmd}$. Command tracking is specified by the performance weights $P_\phi$ and $P_\theta$. Good command tracking performance is required at low frequencies and may be relaxed at higher frequencies. Consequently, $P_\phi$ and $P_\theta$ are low-pass filters. The angular rates are condensed into a vector signal labeled p, q, r. The performance weights $P_{p,q,r}$ are constant scalars and uniformly limit the angular rates of the aircraft across frequency. IMU measurement noise is incorporated into the $H_\infty$ synthesis by the output-additive weights $N_{p,q,r}$. The effect of atmospheric turbulence is modeled by the weight $D_{elev}$ and is applied additively at the plant input. The weight $W_{elev}$ is shaped like a high-pass filter in order to penalize high frequency control commands. This helps in limiting the bandwidth of the controller. The block ACT is a low-pass filter that models the actuator dynamics. All the weights used in $H_\infty$ synthesis are described in Table 2 below.

Robustness analysis is presented as follows. The LQG and $H_\infty$ syntheses result in stable controllers that can be connected with the plant to form the closed loop. The γ value returned from the $H_\infty$ synthesis in the present example is 10.85. Table 1 lists the robustness properties of the closed loops formed with both syntheses. The plant is denoted P and the controller is denoted C. The MIMO gain and phase margins indicate that the $H_\infty$ closed loop is more robust.

TABLE 1

Closed-loop robustness properties

| Property | LQC closed loop | $H_\infty$ closed loop |
| --- | --- | --- |
| Input Sensitivity ($S_i$) | 1.64 dB | 3.33 dB |
| Output Sensitivity ($S_o$) | 5.52 dB | 22.07 dB |
| $PS_i$ | 12.64 dB | 10.01 dB |
| $CS_o$ | −8.76 dB | 17.57 dB |
| MIMO gain margin | [0.61, 1.65] | [0.47, 2.11] |
| MIMO phase margin | ±27.56° | ±39.35° |
| Critical Frequency | 0.24 rad/s | 3.17 rad/s |

Results are discussed as follows. Flight tests of UAV 200 were conducted at the University of Minnesota Outreach, Research, and Education Park over three days between January, 2015 and May, 2015. Each day of the flight test witnessed different wind and turbulence conditions. The control mode laws described in the previous section were developed in Matlab/Simulink and subsequently converted to C code using Simulink Coder. The control laws are implemented within control circuitry 101 (e.g., the flight computer) of UAV 200 at a sampling rate of 50 Hz. In this section, flight test results are presented that demonstrate safe flight using only the left elevator ($E_1$) of UAV 200. Similar conclusions automatically follow for the right elevator ($E_2$) due to the longitudinal symmetry of the aircraft. Of the limited set of maneuvers introduced above, only straight and level flight and banked turns at constant altitude are presented. Steady descents can be executed by decreasing the throttle. Details of use of an example LQG control mode law in the flight tests are described below with reference to FIG. 5.

Figure 5:
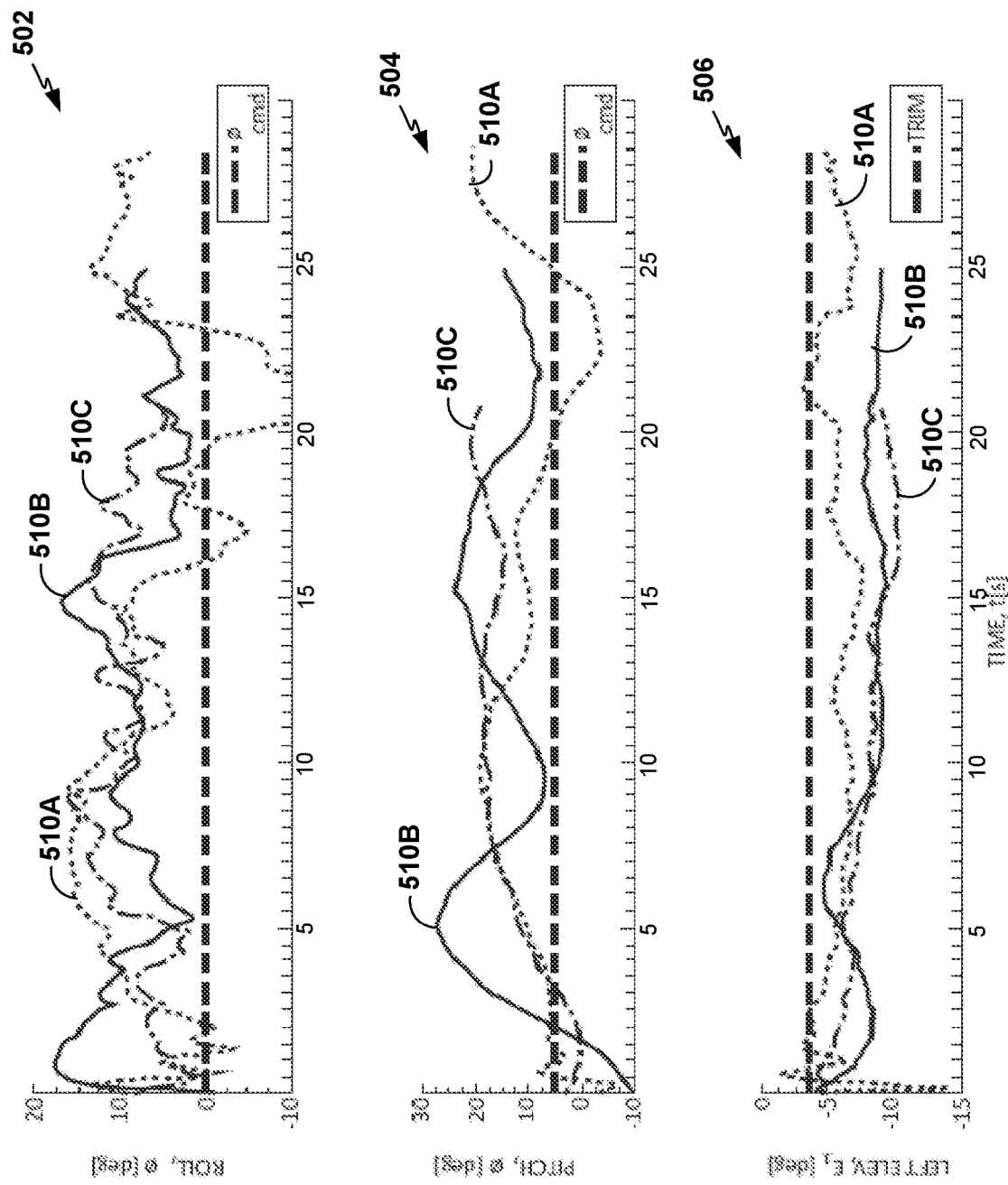
FIG. 5 depicts graphs of a flight test with an LQG controller for three straight and level flights in accordance with example aspects of this disclosure.

FIG. 5 depicts graphs of a flight test with an LQG controller for three straight and level flights in accordance with example aspects of this disclosure. The first set of results are for the LQG control law described above. FIG. 5 shows flights of UAV 200 where the aircraft was commanded to fly straight and level at constant altitude, under control of the LQG backup control mode controlling the one available control surface, the left elevator in this example. That one control surface, such as the left elevator, under control of the LQG backup control mode, is able to exert enough control on both the roll and pitch of the aircraft to maintain the aircraft in sub-optimal but stable flight.

FIG. 5 is divided into three subplots 502, 504, 506, all of which share a common time axis. FIG. 5 shows the time histories of the roll angle, pitch angle, and left elevator command in three different subplots. Each subplot contains data from three different flights of UAV 200, each shown in a different line style. The longest flight 510A lasted 29 seconds and is shown as a dotted line. The second flight 510B lasted 25 seconds and is shown as a solid line. The shortest flight 510C lasted 21 seconds and is shown as a dashed line.

Each plot 510A, 501B, and 510C has a different end time because each of the three flights was of a different duration.

In addition, each of the three subplots contains a black dashed line. For the roll and pitch angle plots, the black dashed line represents reference commands: $\phi_{cmd}$ and $\theta_{cmd}$, respectively. For the left elevator command, the black dashed line represents the trim deflection.

A primary observation from FIG. 5 is that the aircraft is still controllable with a single aerodynamic control surface. Both φ and θ appear to be under control and well within their respective flight envelope bounds. Moreover, φ is between 0 and 20°, with a mean of around 5°, indicating a tendency for the aircraft to roll rightwards. The only exception to this trend is the sudden left bank in the plot 510A near t=20 seconds. This might have been a wind gust hitting the aircraft. The effects of sensor noise and atmospheric turbulence can be seen in the high frequency content of φ. The low frequency variation in φ is more pronounced than usual, given that the aircraft is being commanded to fly straight and level.

The time response of θ, in FIG. 5, is degraded to a similar extent, relative to a standard control mode. Specifically, θ varies between 0 and 30°, with a trim value of 5°. Under the control of a single surface, the aircraft has a tendency to pitch upwards. This positive pitch deflection is seen in plots 510A, 510B, and 510C. The left elevator deflection command is shown in the bottom subplot 506 of FIG. 5. The trim deflection is $\overline{E}_1$=−4°. In all three flights, the left elevator is commanded to deflect negatively. The variation in $E_1$ is largely between −10° and $\overline{E}_1$, indicating that the left elevator never hits the saturation limits of ±25°. The flight test results of UAV 200 performing left banked turns are described below with reference to FIG. 6.

Figure 6:
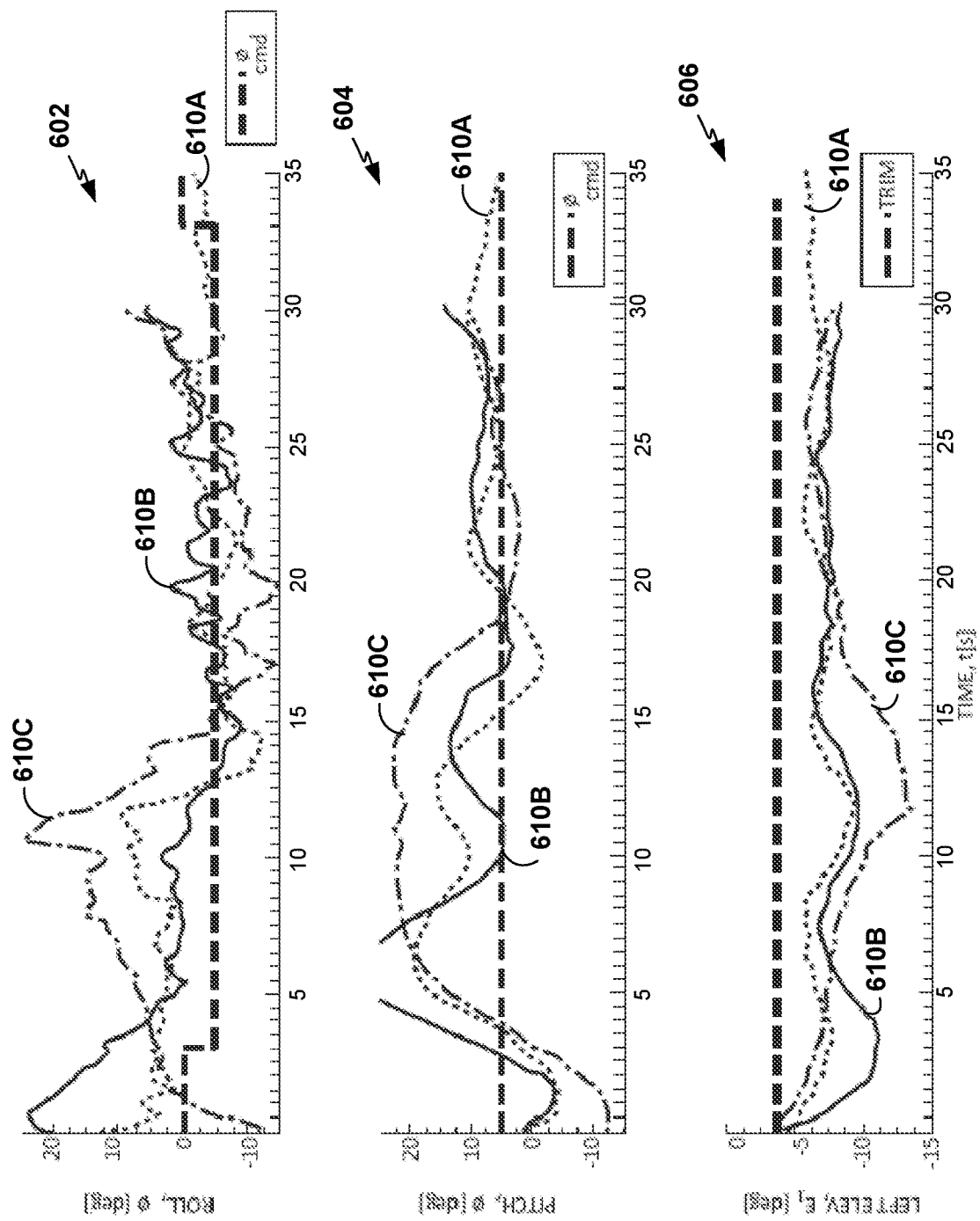
FIG. 6 depicts graphs of a flight test with an LQG controller for three left banked turns in accordance with example aspects of this disclosure.

FIG. 6 depicts graphs of a flight test with an LQG controller for three left banked turns in accordance with example aspects of this disclosure. FIG. 6 is divided into three subplots 602, 604, 606, each showing the time history of $\phi$, $\theta$, and $E_1$. The plots 610A, 610B, and 610C represent three different flights of UAV 200 executing left banked turns. The longest flight 610A lasts 35 seconds and is shown as a dotted line. Flight 610B lasts 30 seconds and is shown as a solid line. The shortest flight 610C lasts 29 seconds and is shown as a dashed line. UAV 200 enters into a left banked turn after a time delay of 3 seconds and stays in this turn for a total duration of 30 seconds. The corresponding bank angle command is −5°, and is shown in the plot of $\phi_{cmd}$. The pitch angle command is 5° and is unaltered from trim. As noted previously, a primary observation from FIG. 6 is that UAV 200 is stable and controllable while executing left banked turns with one control surface. From FIG. 6, it is evident that the tracking performance is better while executing left banked turns than while flying straight and level.

In particular, the $\phi$ response shown in FIG. 6 varies between −10° and 20°. For the first 10 seconds after the start of the maneuver, $\phi$ is approximately between 0 and 10° and does not track $\phi_{cmd}$ well. However, 10 seconds into the start of the maneuver, $\phi$ starts tracking the command well. This delayed tracking is due to the integrators added to the LQG synthesis. Subsequent variations in $\phi$ are within a ±5° window centered at $\phi_{cmd}$=−5°. This is considered good tracking, especially for an aircraft flying with a single control surface. Similar observations can be made for the response of $\theta$. The $\theta$ tracking performance is poor immediately after the start of the maneuver. However, the integral action in the control law kicks in and $\theta$ starts to track $\theta_{cmd}$ around the t=20 seconds mark. Subsequent variations in $\theta$ are also within a ±5° window centered at the trim value of 5°. The left elevator deflection command is between −15° and the trim value of −4°. In all three flights, the left elevator is commanded to deflect negatively.

In summary, the results of this section prove that UAV 200 is stable and controllable even when only one aerodynamic control surface is available. Successful flight tests were also conducted for UAV 200 performing right banked turns. This case is similar to left banked turns. The LQG control law described above performs satisfactorily in flight. All state variables stay within, and do not depart from, their respective flight envelope bounds. While the overall tracking performance is degraded relative to the standard control mode with control of all control surfaces available, this is the effect associated with flying a handicapped aircraft. It is acknowledged that the flight duration in these examples is short (approximately 30 seconds), but this is a promising start to more complicated flight tests. In these example demonstrations, the aircraft directly switches from the pilot's control to fault-tolerant control, without ever switching to baseline control. As a consequence, several runs start with off-nominal initial conditions, leading to worse performance titan is actually the case. In a realistic implementation of fault-tolerant control, the aircraft will switch from baseline control. This should provide initial conditions closer to nominal, leading to better closed loop performance.

Flight tests using an $H_\infty$ control mode law are described as follows. The flights described above using the LQG control law switched directly from the pilot's control to the backup controller. This did not capture the intricacies of switching from the baseline to the backup controller. The examples described in this section present a realistic implementation of the fault-tolerant $H_\infty$ control law described above. The $H_\infty$ control mode law may involve tuning the weights of the control mode parameters. Specifically, in an illustrative example, after the pilot engages the autopilot, the aircraft initially starts flying with the baseline controller in the loop. Then, after a preset time delay of 5 seconds, the flight computer is programmed to automatically switch from the baseline to the backup controller. This ensures that all aircraft states have values reasonably close to the nominal initial condition. It is expected that this switching logic should improve the overall performance of the fault-tolerant control. As before, the baseline and backup controllers, and the switching logic were developed using Matlab/Simulink. Subsequently, Simulink Coder was used for automated C code generation.

Figure 7:
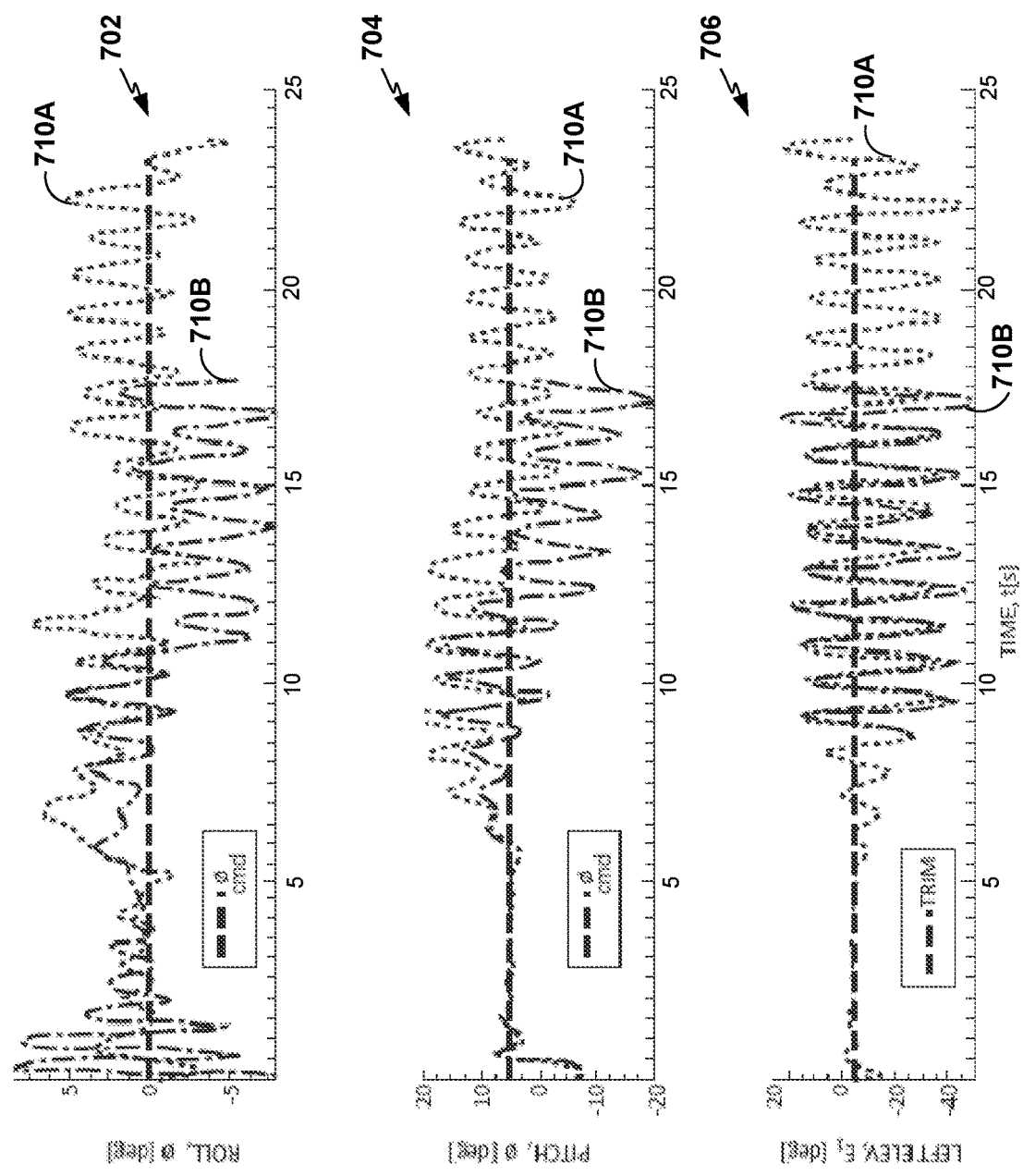
FIG. 7 depicts graphs of a flight test with an $H_\infty$ controller for two straight and level flights in accordance with example aspects of this disclosure.

FIG. 7 depicts graphs of a flight test with an $H_\infty$ controller for two straight and level flights in accordance with example aspects of this disclosure. FIG. 7 shows straight and level flight of UAV 200, with $H_\infty$ control. As in FIGS. 5 and 6, FIG. 7 is divided into three subplots 702, 704, 706, all of which share a common time axis. Each subplot 710A and 710B contains data from two different flights of UAV 200, shown in dotted and dashed lines, respectively. The longer of the two flights 710A lasted 23 seconds and is shown as a solid line. The shorted of the two flights 710B lasted 17 seconds and is shown as a dashed line. All other notation in FIG. 7 is the same as before. The time scales of both flights have been shifted such that autopilot engagement starts at t=0 seconds (s). In the period t∈[0,5) s, the flight computer engages the baseline controller. As seen in the plots, the baseline controller has good command tracking and disturbance rejection properties. At t=5 seconds, the flight computer switches to the backup $H_\infty$ controller for the remainder of the flight.

After the backup $H_\infty$ controller is engaged (t>5 s), oscillations are seen in $\phi$, $\theta$, and $E_1$. These oscillations appear to be undamped: they neither grow nor decay in amplitude. For $\phi$, these oscillations have an amplitude of approximately 5° and a mean close to $\phi_{cmd}$=0. For $\theta$, these oscillations have an amplitude of approximately 7° and a mean close to $\theta_{cmd}$=5°. Although the presence of these oscillations is not ideal, their amplitude is small enough to not lead to loss of control (LOC). Specifically, the aircraft remains fully controllable throughout the duration of engagement of the $H_\infty$ control law. However, concerning oscillations are seen in the response of $E_1$. The left elevator command appears to exceed the lower saturation bound of −25°, after the $H_\infty$ control law is engaged. Despite $E_1$ exceeding the lower saturation bound, the aircraft states are well behaved. Particularly, both $\phi$ and $\theta$ remain within their respective flight envelope bounds. The flight test results of UAV 200 performing fight banked turns using $H_\infty$ control are described below with reference to FIG. 8.

Figure 8:
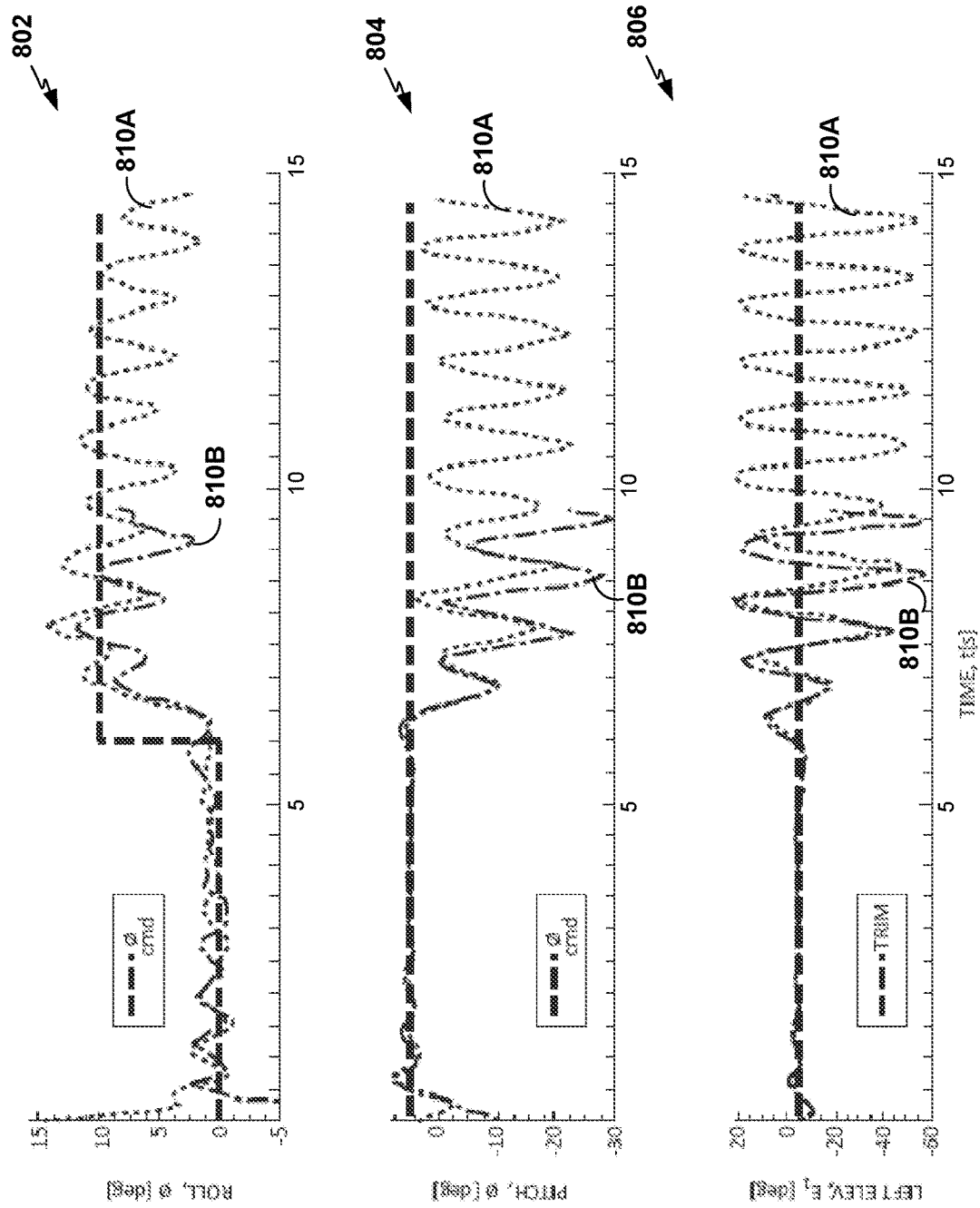
FIG. 8 depicts graphs of a flight test with an $H_\infty$ controller for two right banked turns in accordance with example aspects of this disclosure.

FIG. 8 depicts graphs of a flight test with an $H_\infty$ controller for two right banked turns in accordance with example aspects of this disclosure. FIG. 8 is organized in the same way and has the same notation as in the previous figures, with subplots 802, 804, 806. The longer of the two flights 810A lasts 15 seconds and is shown as a dotted line. The shorter of the two flights 810E lasts 9 seconds and is shown as a dashed line. UAV 200 enters into a right banked turn after a time delay of 6 seconds and stays in this turn for the remainder of the maneuver. The corresponding bank angle command is +10°. As before, the flight computer first runs the baseline controller for t∈[0,5) s. At t=5 seconds, the flight computer switches to the $H_\infty$ controller. From the $\phi$ response, it is seen that command tracking is faster with the $H_\infty$ controller. The rise time for $\phi$ is 1 second. Oscillations, of similar magnitudes as before, are seen in the $\phi$ and $\theta$ responses. It is concerning that oscillations in $\theta$ reach −30°.

However, the aircraft remains fully controllable and no LOC event occurs. As before, $E_1$ appears to exceed the lower saturation bound of $-25°$.

In summary, the $H_\infty$ backup control mode or control law allows for UAV 200 to continue flying even with one control surface. That one control surface, such as the left elevator, under control of the $H_\infty$ backup control mode, is able to exert enough control on both the roll and pitch to maintain the aircraft in sub-optimal but stable flight. The oscillations seen in FIGS. 7 and 8 can be mitigated by reselecting the weighting functions used in the $H_\infty$ synthesis. Specifically, a higher penalty can be imposed on control surface usage by returning the weight $W_{elev}$ in FIG. 4. In addition, better weight selection can reduce, or even avoid, the oscillations seen in $\phi$, $\theta$, and $E_1$.

This disclosure introduces the concept of safely flying an aircraft using only one aerodynamic control surface. Two inner-loop controllers were flight tested to perform banked as well as straight and level maneuvers. Both controllers performed satisfactorily in the flight tests. In the best-case scenario, both controllers are able to track roll and pitch reference commands to within five degrees of tolerance. The tracking performance is influenced by atmospheric conditions. This demonstration highlights the potential for applying robust control theory in designing fault-tolerant controllers. In particular, advanced feedback control can be used to stabilize an aircraft even under extreme fault scenarios, such as a single functional control surface.

Figure 9:
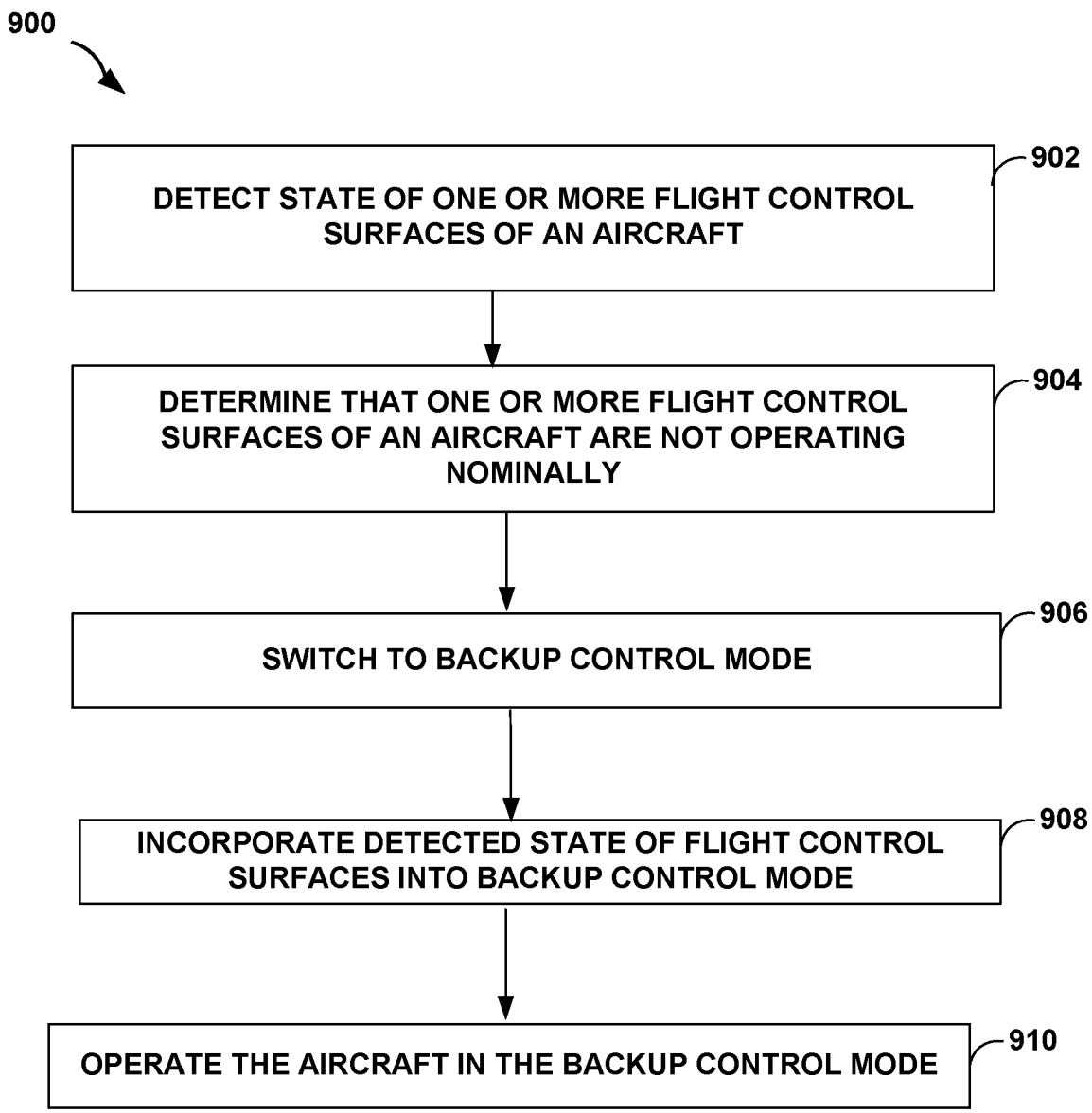
FIG. 9 depicts a flowchart for a method that may be performed by an aircraft control system in accordance with example aspects of this disclosure.

FIG. 9 depicts a flowchart for a method 900 that may be performed by an aircraft control system in accordance with example aspects of this disclosure. In one example, aircraft control circuitry 101 of FIG. 1 detects the state of one or more flight control surfaces of an aircraft, such as UAV 100 or UAV 200 (902). Control circuitry 101 determines that at least one of the one or more flight control surfaces are not operating nominally (904). In one example, control circuitry 101 determines that at least one of the one or more flight control surfaces have failed or are inoperable. In response to detecting that one or more of the flight control surfaces of the aircraft are not operating nominally, control circuitry 101 switches to a backup control mode configured to operate the aircraft in flight with non-nominal operability of one or more control surfaces of the aircraft (906). Further, control circuitry 101 incorporates the detected state of the one or more flight control surfaces into the backup control mode (908). For example, control circuitry 101 determines control schema to safely operate UAV 100 or UAV 200 without the use of the one or more flight control surfaces that are not operating nominally. In another example, control circuitry 101 determines control schema to safely operate UAV 100 or UAV 200 with only a single operable flight control surface, in the event that all the remaining flight control surfaces are stuck at their respective trim positions. Control circuitry 101 operates the aircraft in the backup control mode (910). In some examples, control circuitry 101 implements a safe return and land procedure for UAV 100 or UAV 200 with the remaining operable flight control surface or surfaces.

Example Linear Aircraft Model Parameters.

The nominal trim point for UAV 200 is given by the pair $(\bar{x}, \bar{u})$, where V=23 ms$^{-1}$, $\alpha$=5.2°, $\beta$=0°, $\phi$=0, $\theta$=5.2°, p=q=r=0, $\tau$=0.5, $E_1$=$E_2$=$-5.08°$, R1=R2=0, $-$A1=A2=$-0.3°$, and F1=F2=0. Note that the elevator trim of $-5.08°$ corresponds to the angle of attack of 5.2°. The aileron trim of $-0.3°$ is used to compensate for the torque from the electric motor. The nonlinear aircraft model is linearized at this nominal trim point. The state-space matrices of the linear model (P) are given in equation 10.

$$P := \left[\begin{array}{c|c} A & B \\ \hline C & D \end{array}\right] = \begin{bmatrix} 0 & 0 & 1 & 0 & 0.09 & 0 & 0 & 0 & 0 \\ 0 & 0 & 0 & 1 & 0 & 0 & 0 & 0 & 0 \\ 0 & 0 & -9.5 & 0.058 & 2.4 & 0.001 & -1.6 & 0 & 8.1 \\ 0 & 0 & 0 & -7.8 & 0.42 & 0.39 & -0.026 & -2.2 & -39 \\ 0 & 0 & 0.58 & -0.26 & -1.7 & 0 & 0.69 & 0 & -0.93 \\ 0 & -9.8 & 0 & -2.1 & 0 & -0.32 & -0.11 & 0.83 & 0.39 \\ 9.8 & 0 & 2.1 & 0 & -23 & 0 & -0.43 & 0 & 0 \\ 0 & -0.89 & 0 & 23 & 0 & -0.33 & -0.096 & -5.7 & -4.6 \\ 1 & 0 & 0 & 0 & 0 & 0 & 0 & 0 & 0 \\ 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \\ 0 & 0 & 0 & 0 & 1 & 0 & 0 & 0 & 0 \end{bmatrix} \quad (10)$$

Example LQG Synthesis Parameters.

The maximum values for the states are defined as: $\phi_{max}=\theta_{max}=5°$, $p_{max}=q_{max}=r_{max}=10°$ s$^{-1}$, and $(u_{max}, v_{max}, w_{max})=(5, 0.87, 0.44)$ ms$^{-1}$. The maximum value for the control surface deflection is defined as: $E1_{max}=50°$. The matrices Q and R that appear in equation 9 are defined as shown in equations 11 and 12.

$$Q = \mathrm{diag}(\phi_{max}^{-2}, \theta_{max}^{-2}, p_{max}^{-2}, q_{max}^{-2}, r_{max}^{-2}, u_{max}^{-2}, v_{max}^{-2}, w_{max}^{-2}) \quad (11)$$

$$R = E1_{max}^{-2} \quad (12)$$

The covariance of the state variables are defined as: $\phi_{cov}=\theta_{cov}=5\times10^{-4}$ rad$^2$, $p_{cov}=q_{cov}=r_{cov}=5\times10^{-5}$ rad$^2$s$^{-2}$, $u_{cov}=v_{cov}=w_{cov}=0.05$ m$^2$/s$^2$. The covariance of the process noise (w) and measurement noise (v) signals are defined as shown in equations 13 and 14.

$$E[ww^T] = \mathrm{diag}(\phi_{cov}, \theta_{cov}, p_{cov}, q_{cov}, r_{cov}, u_{cov}, v_{cov}, w_{cov}) \quad (13)$$

$$E[vv^T] = \mathrm{diag}(\phi_{cov}, \theta_{cov}, p_{cov}, q_{cov}, r_{cov}) \quad (14)$$

The integral gains used for command tracking are $-8$ in the $\phi$ channel and $-6$ in the $\theta$ channel.

Example $H_\infty$ Synthesis Parameters.

The weighting functions for the $H_\infty$ synthesis are listed in table 2.

TABLE 2

Weighting functions used in $H_\infty$ synthesis

| Weight | Value |
| --- | --- |
| $P_\varphi$ | $\dfrac{0.1s + 5.973}{s + 0.176}$ |
| $P_\theta$ | $\dfrac{0.1s + 12.03}{s + 6.766}$ |
| $P_{p,q,r}$ | $5.73\, I_3$ |
| $N_{p,q,r}$ | $0.1\, I_3$ |
| $D_{elev}$ | $0.01$ |
| $W_{elev}$ | $\dfrac{1.423s + 76.31}{s + 11.92}$ |
| ACT | $\dfrac{50.27}{s + 50.27}$ |

Figure 10:
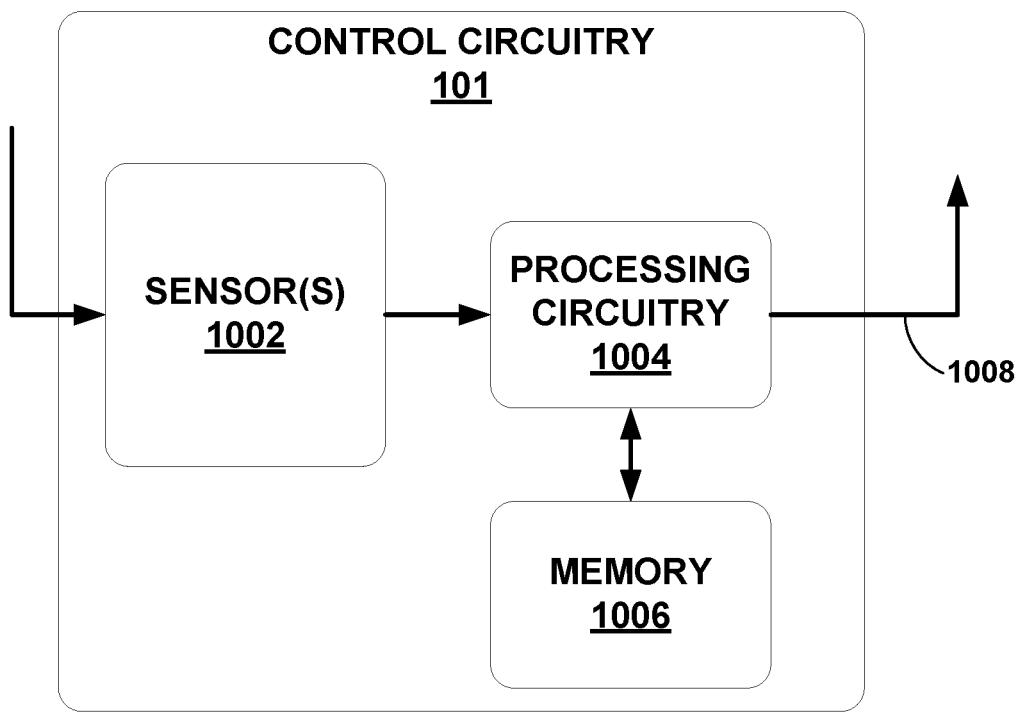
FIG. 10 is an illustration of example control circuitry of an aircraft in accordance with the techniques of the disclosure.

FIG. 10 is an illustration of example control circuitry 101 of an aircraft, such as UAV 100 of FIG. 1 or UAV 200 of FIGS. 2A-2B, in accordance with the techniques of the disclosure. In some examples, controller 101 includes sensor(s) 1002, which detects a state of one or more flight control surfaces of UAV 100 or UAV 200. One or more sensor 1002 provides an input to processing circuitry 1004, which, based on instructions stored in memory 1006, provides a control signal 1008 to one or more flight control surface actuators for controlling the flight of UAV 100 or UAV 200.

Sensors 1002 are sensors capable of detecting the function or non-function of at least one flight control surface of UAV 100 or UAV 200. In some examples, sensors 1002 include one or more IMUS, such as a strap-down IMU. In other examples, sensors 1002 include one or more control surface sensors, such as one or more of a potentiometer, a position sensor, an optical encoder, a strain gauge, or a thermal sensor. Sensors 1002 may further include one or more global positioning system units (GPSs), airdata proves, gyroscopes, accelerometers, or tilt sensors.

In some examples, processing circuitry 1004 is one or more microprocessors, digital signal processors (DSPs), application specific integrated circuits (ASICs), field programmable gate arrays (FPGAs), or any other equivalent integrated or discrete logic circuitry, as well as any combinations of such components. Processing circuitry 1004 may incorporate one or more flight control computers that determine, based on input from sensors 1002, a control signal 1008 to safely control the flight of UAV 100 or UAV 200 with at least one flight control surface and output control signal 1008 to one or more flight control surface actuators.

In some examples, memory 1006 stores instructions with which processing circuitry 1004 may determine control signal 1008. Further, memory 1006 may be random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof.

According to the techniques of the disclosure, processing circuitry 1004 operates the UAV in a baseline control mode when all control surfaces are healthy. In one example, processing circuitry 1004 detects, based on input from control surface sensors of sensors 1002, a fault in one or more flight control surfaces of the UAV, In response to detecting that the one or more flight control surfaces of the UAV are not operating nominally, processing circuitry 1004 switches to a backup control mode configured to operate the UAV in flight with non-nominal operability of the one or more of the control surfaces of the UAV.

In one example, while in the backup control mode, processing circuitry 1004 receives input from other types of sensors 1002 for safely controlling the flight of UAV. In one example, processing circuitry 1004 receives input from one or more IMUS, GPS receivers, and airdata probes of sensors 1002, and based on this input, provides a control signal 1008 to at least one nominal flight control surface actuator for safely controlling the flight of the UAV despite that the one or more flight control surfaces of the UAV are not operating nominally. In some examples, processing circuitry 1004 provides a control signal 1008 to the one or more flight control surfaces of the UAV that are not operating nominally to lock the one or more flight control surfaces of the UAV that are not operating nominally in their respective trim positions. In some examples, processing circuitry 1004 provides a control signal 1008 to a single nominal flight control surface actuator and safely controls the flight of the UAV via a single nominal flight control surface.

In one example, the techniques of the disclosure describe a computer-readable medium comprising instructions for causing a programmable processor to: detect whether flight control surfaces of an unmanned aerial vehicle (UAV) are operating nominally; switch, in response to detecting that one or more of the flight control surfaces of the UAV are not operating nominally, to implementing a backup control mode configured to operate the UAV in flight with non-nominal operability of one or more control surfaces of the UAV; and operate the UAV in the backup control mode.

In a further example, the techniques of the disclosure describe the above computer-readable medium, wherein, to operate the UAV in the backup control mode, the instructions further cause the processor to implement a return and land procedure for the UAV.

In a further example of the above computer-readable medium, the instructions further cause the programmable processor to: initially operate the UAV in a standard control mode, and detect whether the flight control surfaces of the UAV are operating nominally at least once during operating the UAV in the standard control mode.

In another example, the techniques of the disclosure describe a method comprising: detecting, by one or more processors of a controller within an unmanned aerial vehicle (UAV), that one or more flight control surfaces of the UAV are malfunctioning; switching, by the one or more processors, in response to detecting that the one or more flight control surfaces of the UAV are malfunctioning, to implementing a backup control mode configured to operate the UAV in flight by maintaining the UAV in flight by operating one or more remaining functioning control surfaces of the UAV; and maintaining, by the one or more processors, the UAV in flight by operating the one or more remaining functioning control surfaces of the UAV.

In another example, the techniques of the disclosure describe a method comprising: detecting, by one or more processors of a controller within an aircraft, whether flight control surfaces of the aircraft are operating nominally; switching, by the one or more processors, in response to detecting that one or more of the flight control surfaces of the aircraft are not operating nominally, to implementing a backup control mode configured to operate the aircraft in flight with non-nominal operability of one or more of the control surfaces of the aircraft; and operating, by the one or more processors, the aircraft in the backup control mode.

In a further example of the above method, operating the aircraft in the backup control mode comprises operating the aircraft in flight with operability of only a single nominal control surface of the aircraft.

In a further example of the above method, the aircraft is a manned aircraft.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various embodiments of the invention have been describe. These and other embodiments are within the scope of the following claims.

What is claimed is:

1. A method comprising:
   detecting, by one or more processors of a controller within an unmanned aerial vehicle (UAV), whether flight control surfaces of the UAV are operating nominally;
   switching, by the one or more processors of the controller, in response to detecting that one or more of the flight control surfaces of the UAV are not operating nominally, to implementing a backup control mode configured to operate the UAV in flight with non-nominal operability of one or more of the control surfaces of the UAV; and
   operating, by the one or more processors of the controller, the UAV in flight and in the backup control mode with operability of only a single nominal control surface of the UAV.

2. The method of claim 1, wherein operating the UAV in the backup control mode further comprises:
   actuating only the single nominal control surface of the UAV; and
   locking one or more non-nominal control surfaces of the UAV into a respective trim position for the one or more non-nominal control surfaces of the UAV.

3. The method of claim 1, wherein implementing the backup control mode comprises:
   detecting, by the one or more processors, a state of the one or more of the flight control surfaces of the UAV that are not operating nominally; and
   incorporating, by the one or more processors, the detected state of the one or more of the flight control surfaces of the UAV that are not operating nominally in the backup control mode.

4. The method of claim 1, wherein implementing the backup control mode comprises modifying, by the one or more processors and based on the one or more of the flight control surfaces of the UAV that are not operating nominally, control parameters for roll rate (p), pitch rate (q), and yaw rate (r) in an aircraft control linear model.

5. The method of claim 1, wherein implementing the backup control mode comprises modifying, by the one or more processors, the parameters of a flight control law; and
   wherein operating the UAV in the backup control mode comprises operating, based on the modified parameters of the flight control law, the UAV.

6. The method of claim 5, wherein the flight control law is designed using a linear quadratic Gaussian (LQG) control design technique.

7. The method of claim 5, wherein the flight control law is designed using an H infinity ($H_\infty$) control design technique.

8. The method of claim 1, wherein implementing the backup control mode comprises using a Kalman filter to minimize steady-state covariance of error in state estimates of a linearized aircraft model in a state-space representation.

9. The method of claim 8, wherein using the Kalman filter to minimize the steady-state covariance of the error in the state estimates comprises determining an optimization in accordance with $$\mathrm{minimize}\left(\lim_{t\to\infty} E[(x-\hat{x})(x-\hat{x})^T]\right).$$

wherein E is a deflection of the one or more of the control surfaces, x is a state vector of the linearized aircraft model, $\hat{x}$ is a state estimate of the linearized aircraft model, and T is time.

10. The method of claim 8, wherein the Kalman filter is a state estimator of a linear quadratic Gaussian (LQG) model.

11. The method of claim 1, wherein implementing the backup control mode comprises using a state estimator of an H infinity ($H_\infty$) controller.

12. The method of claim 1, wherein operating the UAV in the backup control mode comprises implementing a return and land procedure for the UAV.

13. The method of claim 1, further comprising:
initially operating the UAV in a standard control mode,
wherein detecting whether the flight control surfaces of the UAV are operating nominally is performed at least once during operating the UAV in the standard control mode.

14. An unmanned aerial vehicle (UAV) comprising:
a plurality of flight control surfaces; and
a control system comprising memory and at least one processor, the at least one processor configured to:
detect whether one or more flight control surfaces of the plurality of flight control surfaces of the UAV is operating nominally;
upon detecting that the one or more flight control surfaces of the plurality of flight control surfaces of the UAV is not operating nominally, implement a backup control mode configured to operate the UAV in flight with non-nominal operability of the one or more flight control surfaces of the plurality of flight control surfaces of the UAV; and
operate the UAV in flight and in the backup control mode with operability of only a single nominal control surface of the UAV.

15. The unmanned aerial vehicle (UAV) of claim 14, wherein, to operating the UAV in the backup control mode, the at least one processor is further configured to:
actuate only the single nominal control surface of the UAV; and
lock one or more non-nominal control surfaces of the UAV into a respective trim position for the one or more non-nominal control surfaces of the UAV.

16. Control circuitry for an unmanned aerial vehicle (UAV) comprising memory and at least one processor configured to:
detect whether flight control surfaces of the UAV are operating nominally;
switch, in response to detecting that one or more of the flight control surfaces of the UAV are not operating nominally, to implementing a backup control mode configured to operate the UAV in flight with non-nominal operability of one or more control surfaces of the UAV; and
operate the flight control surfaces of the UAV in the backup control mode; wherein, to operate the UAV in the backup control mode, the at least one processor operates the UAV in flight with operability of only a single nominal control surface of the UAV.

17. The control circuitry of claim 16, further configured to:
detect a state of the one or more of the flight control surfaces of the UAV are not operating nominally; and
incorporate the detected state of the one or more of the flight control surfaces of the UAV that are not operating nominally in the backup control mode.

18. The control circuitry of claim 16, wherein, to implement the backup control mode, the at least one processor is further configured to modify control parameters for roll rate (p), pitch rate (q), and yaw rate (r) in an aircraft control linear model.

19. The control circuitry of claim 16, wherein, to implement the backup control mode, the at least one processor is further configured to modify the parameters of a flight control law; and
wherein, to operate the UAV in the backup control mode, the at least one processor is further configured to operate, based on the modified parameters of the flight control law, the UAV.

20. The control circuitry of claim 19, wherein the flight control law is designed using an H infinity ($H_\infty$) control design technique.

21. The control circuitry of claim 19, wherein the flight control law is designed using a linear quadratic Gaussian (LQG) control design technique.

22. The control circuitry of claim 16, wherein, to implement the backup control mode, the at least one processor is further configured to use a Kalman filter to minimize steady-state covariance of error in state estimates of a linearized aircraft model in a state-space representation.

23. The control circuitry of claim 22, wherein using the Kalman filter to minimize the steady-state covariance of the error in the state estimates comprises determining an optimization in accordance with $$\text{minimize}\left(\lim_{t\to\infty} E[(x-\hat{x})(x-\hat{x})^T]\right).$$

wherein E is a deflection of the one or more of the control surfaces, x is a state vector of the linearized aircraft model, $\hat{x}$ is a state estimate of the linearized aircraft model, and T is time.

24. The control circuitry of claim 23, wherein the Kalman filter is a state estimator of a linear quadratic Gaussian (LQG) model.

25. The control system of claim 23, wherein, to implement the backup control mode, the at least one processor is configured to use a state estimator of an H infinity ($H_\infty$) controller.

26. The control circuitry of claim 16, wherein, to operate the UAV in the backup control mode, the at least one processor is configured to implement a return and land procedure for the UAV.

27. The control circuitry of claim 16, wherein the at least one processor is configured to:
initially operate the UAV in a standard control mode, and
detect whether the flight control surfaces of the UAV are operating nominally at least once while operating the UAV in the standard control mode.

28. A non-transitory computer-readable medium comprising instructions for causing a programmable processor to:
detect whether flight control surfaces of an unmanned aerial vehicle (UAV) are operating nominally;
switch, in response to detecting that one or more of the flight control surfaces of the UAV are not operating nominally, to implementing a backup control mode configured to operate the UAV in flight with non-nominal operability of one or more control surfaces of the UAV; and
operate the UAV in flight and in the backup control mode with operability of only a single nominal control surface of the UAV.

29. The non-transitory computer-readable medium of claim 28, wherein the instructions further cause the programmable processor to:
detect a state of the one or more of the flight control surfaces of the UAV are not operating nominally; and
incorporate the detected state of the one or more of the flight control surfaces of the UAV that are not operating nominally in the reduced flight control surface operability control mode.

30. The non-transitory computer-readable medium of claim 28, wherein, to implement the backup control mode, the instructions further cause the processor to modify control parameters for roll rate (p), pitch rate (q), and yaw rate (r) in an aircraft control linear model.

31. The non-transitory computer-readable medium of claim 28, wherein, to implement the backup control mode, the instructions further cause the processor to use a Kalman filter to minimize steady-state covariance of error in state estimates of a linearized aircraft model in a state-space representation.

\* \* \* \* \*